(12) United States Patent
Sukeno et al.

(10) Patent No.: US 6,590,601 B2
(45) Date of Patent: Jul. 8, 2003

(54) VIDEOPHONE APPARATUS WITH PRIVACY PROTECTION

(75) Inventors: Junji Sukeno, Tokyo (JP); Yoshiko Hatano, Tokyo (JP); Takuji Kurashita, Tokyo (JP); Tadashi Minobe, Tokyo (JP); Kazuhiro Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/788,451

(22) Filed: Feb. 21, 2001

(65) Prior Publication Data

US 2001/0033324 A1 Oct. 25, 2001

(30) Foreign Application Priority Data

Apr. 19, 2000 (JP) ........................................ 2000-117406

(51) Int. Cl.[7] ................................................. H04N 7/14
(52) U.S. Cl. ................................ 348/14.01; 348/14.07; 348/578
(58) Field of Search ........................... 348/14.01, 14.02, 348/14.03, 14.04, 14.05, 14.07, 14.08, 578, 580, 584, 586; 345/726; 379/93.17

(56) References Cited

U.S. PATENT DOCUMENTS 5,889,549 A * 3/1999 Yasuda et al. ............ 348/14.01

FOREIGN PATENT DOCUMENTS

| JP | 402022986 A | * | 1/1990 | ............ H04N/7/15 |
| JP | 404266286 A | * | 9/1992 | ............ H04N/7/14 |
| JP | 406121302 A | * | 4/1994 | ............ H04N/7/14 |
| JP | 409200714 A | * | 7/1997 | ............ H04N/7/14 |

OTHER PUBLICATIONS

Katata et al., "MPEG–4 Camera for use with Internet", IEEE Transactions on Consumer Electronics, Aug. 1999, vol. 45, No. 3.

* cited by examiner

Primary Examiner—Melur Ramakrishnaiah
(74) Attorney, Agent, or Firm—Birch, Stewart, Kolasch & Birch, LLP

(57) ABSTRACT

A videophone takes a live picture of the user, sends the live picture during part of a call, generates a processed picture different from the live picture, and sends the processed picture during another part of the call. The processed picture may be prepared in advance, or may be generated by combining the live picture with a prepared picture. Alternatively, the processed picture may be obtained by increasing a quantization coefficient of the live picture, producing a mosaic effect that disguises the live picture. The processed picture can be sent to protect the privacy of the videophone user, or to provide appropriate transition at the beginning or end of the call. The processed picture can also be sent when the call is placed on hold.

19 Claims, 24 Drawing Sheets

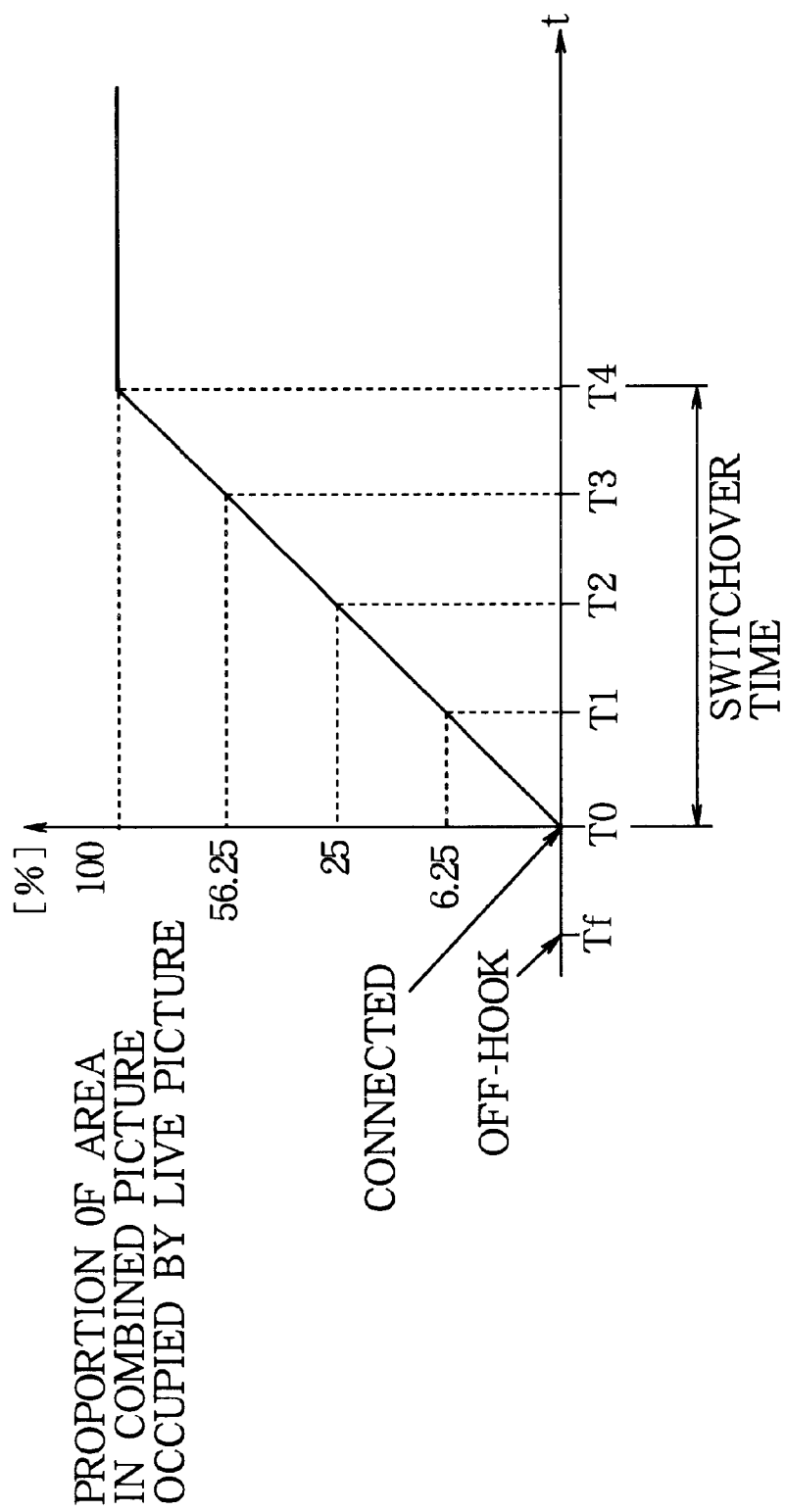

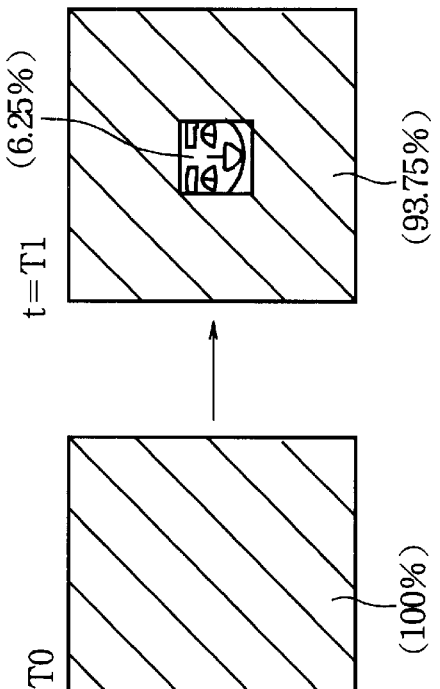
FIG.7C  t=T1  (6.25%)  (93.75%)
FIG.7B  t=T0  (100%)
FIG.7A  t=Tf
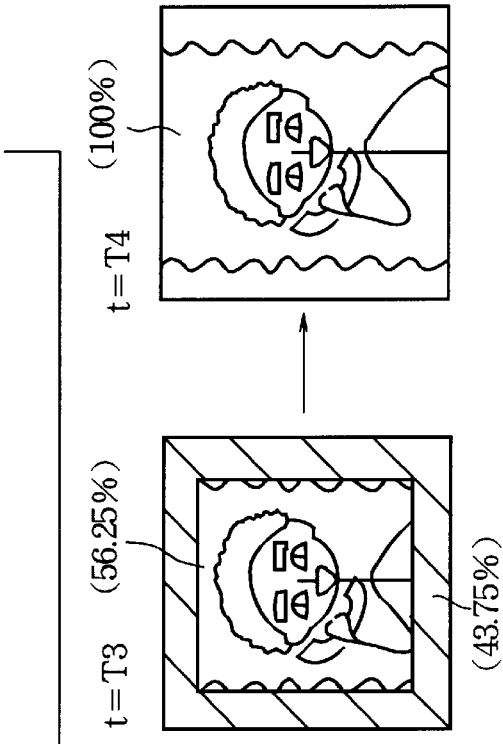
FIG.7F  t=T4  (100%)
FIG.7E  t=T3  (56.25%)  (43.75%)
FIG.7D  t=T2  (25%)  (75%)

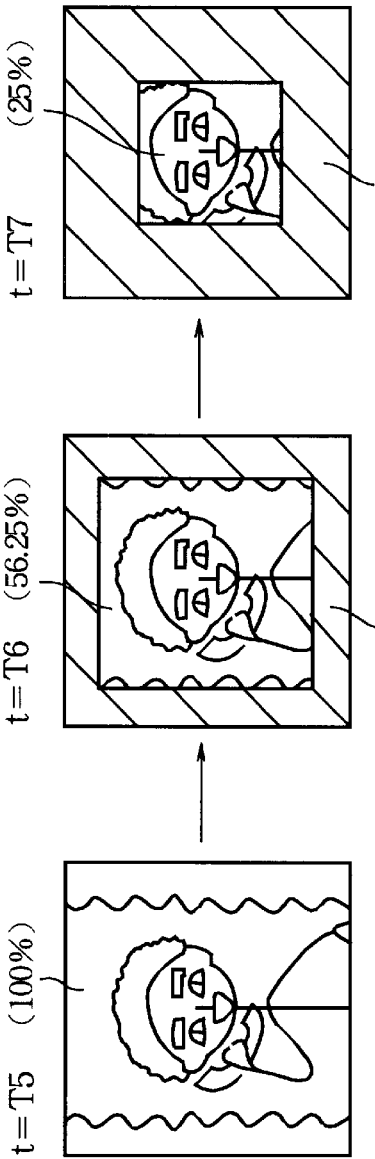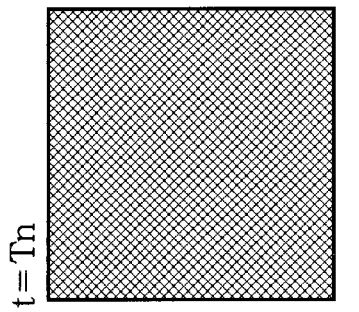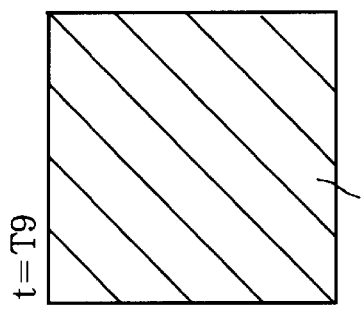
FIG.9A  FIG.9B  FIG.9C  FIG.9D  FIG.9E  FIG.9F

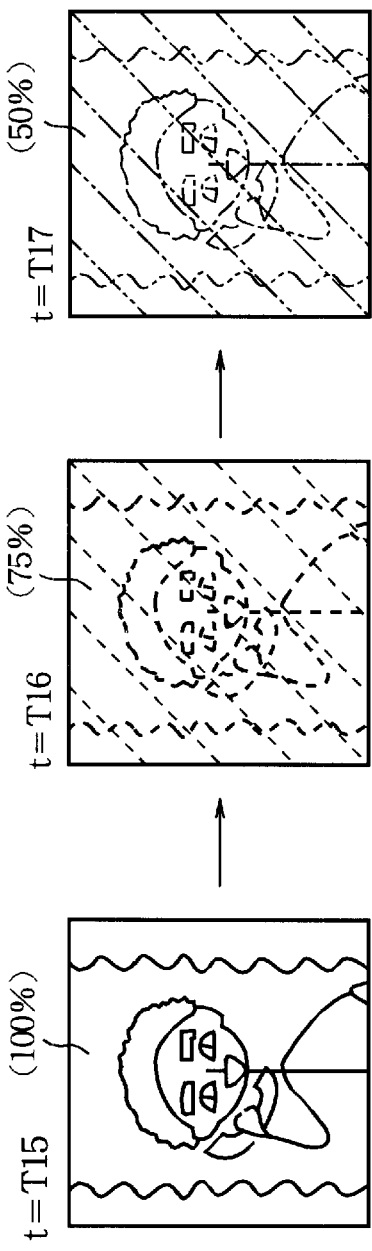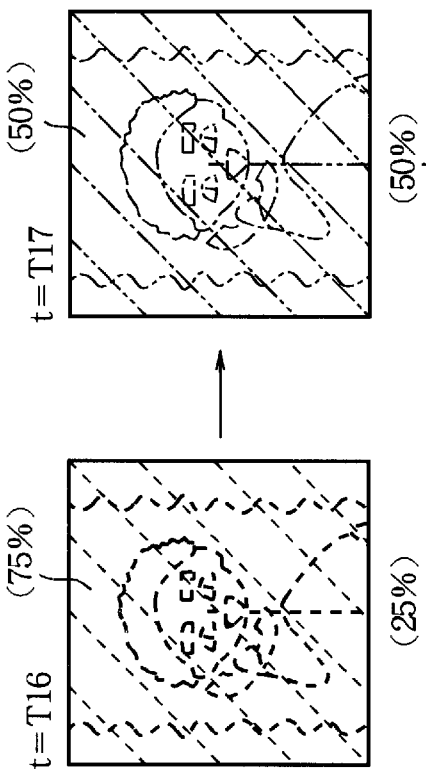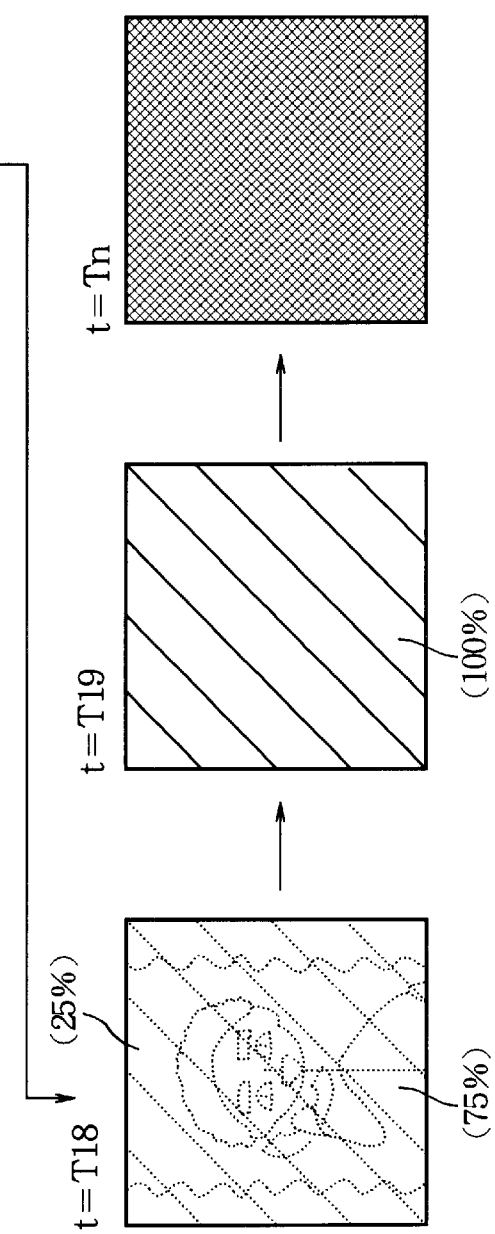

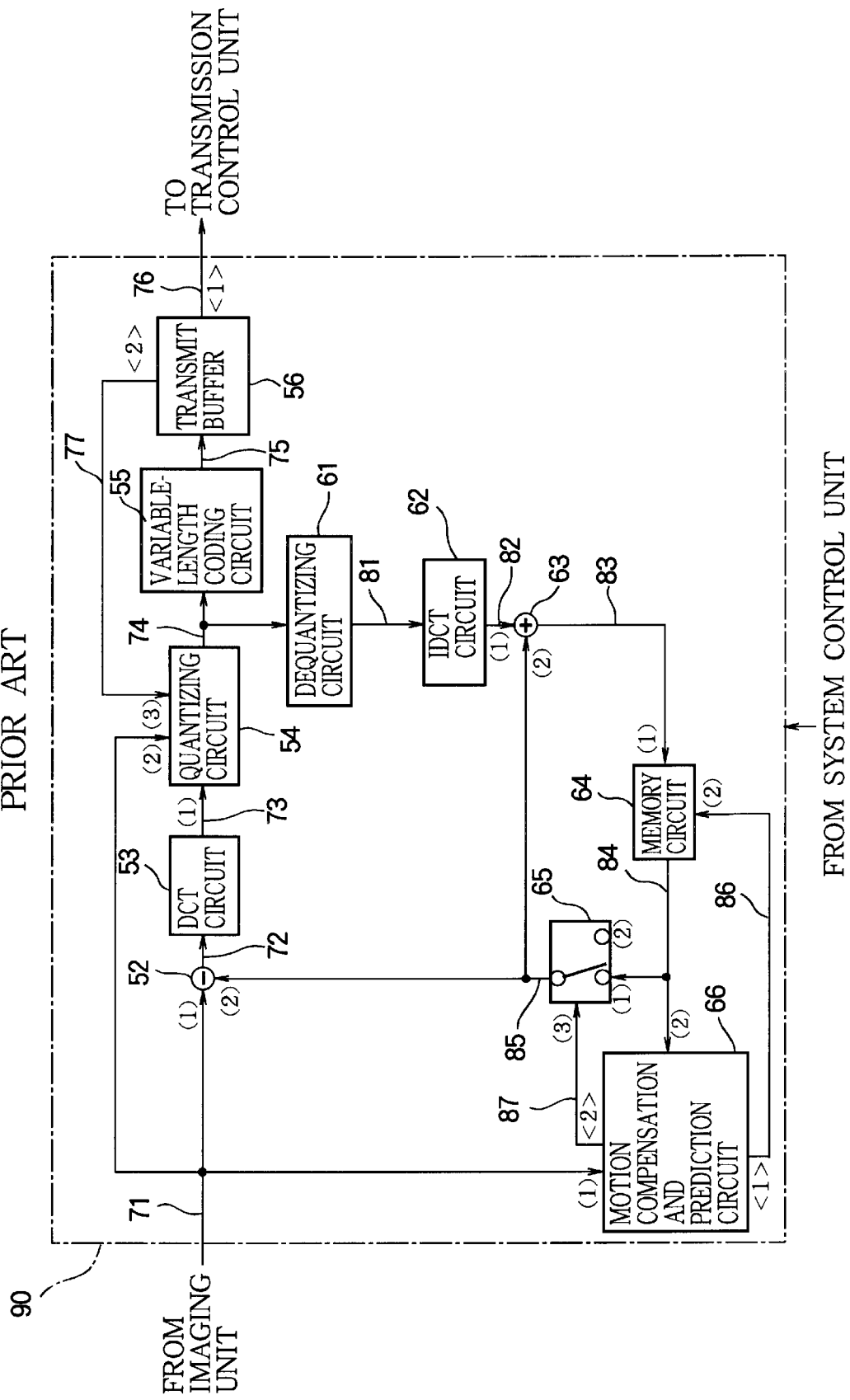

VIDEOPHONE APPARATUS WITH PRIVACY PROTECTION

BACKGROUND OF THE INVENTION

The present invention relates to a videophone apparatus forming one terminal of a videophone system that sends and receives picture data as well as voice data over a communication line, more particularly to a videophone apparatus that modifies or replaces a live picture of the user for purposes of courtesy and privacy protection.

In recent years, with the development of communication networks and advances in data compression technology, videophone systems that can communicate (send and receive) not only voice but also pictures over the same line have gradually been spreading. Differing from conventional telephone systems that send and receive only speech, videophone systems have made it possible to converse while seeing the other party's face.

A videophone system and a conventional videophone apparatus will be described below with reference to the drawings.

FIG. 22 is an overall block diagram showing a videophone system using conventional videophone apparatus.

In the videophone system in FIG. 22, a videophone apparatus 1 and a videophone apparatus 21 are disposed on opposite sides of a communication network 40 such as a telephone network. The sending and receiving of voice and pictures is thus carried out through the communication network 40 between videophone apparatus 1 and videophone apparatus 21. The user of videophone apparatus 1 is a speaker 2 (Mr. A); the user of videophone apparatus 21 is a speaker 22 (Mr. B). Speaker 22 (Mr. B) and the background 23 of Mr. B appear on the monitor screen 12a of videophone apparatus 1; speaker 2 (Mr. A) and the background 3 of Mr. A appear on the monitor screen 12b of videophone apparatus 21.

In videophone apparatus 1 and videophone apparatus 21 there are provided: an operation unit (OP) 11 by which the speakers 2, 22 give instructions to the videophone apparatus 1 and videophone apparatus 21; a display unit 12 that displays the faces of the far-end speakers 2, 22, their backgrounds 3, 23, and so on; an imaging unit 13 that images the faces of the speakers 2, 22, their backgrounds 3, 23, and so on; a handset 14 by which the speakers 2, 22 input and output their voices; a system control unit (SYSCON) 15 that controls the coding and decoding of voice data and picture data and the operation of the videophone apparatus 1 or 21 overall according to the instructions input from the operation unit 11; a voice-data coding/decoding unit 16 that codes signals input from the handset 14 and decodes signals sent to the handset 14; a picture-data coding/decoding unit 17 that codes signals input from the imaging unit 13 and decodes signals sent to the display unit 12; a transmission control unit (TXCON) 18 that converts signals output from the voice-data coding/decoding unit 16 and picture-data coding/decoding unit 17 to signals for transmission on the communication network 40, extracts picture data and voice data from incoming transmitted signals on the communication network 40, and outputs these data to the voice-data coding/decoding unit 16 and picture-data coding/decoding unit 17; and a line interface unit 19 that carries out adjustments of the signal level, signaling system, and so on in order to adapt the output signals of the transmission control unit 18 to the communication network 40, and carries out adjustments of the signal level, signaling system, and so on so that signals received from the communication network 40 can be processed inside the videophone apparatus 1, 21.

Next, the coding of the transmitted pictures in FIG. 22 will be explained in more detail.

FIG. 23 is a drawing that shows selected blocks related to the process of coding transmitted pictures in the videophone apparatus 1 in FIG. 22.

A line-connect/disconnect key (off-hook/on-hook key) 11a is provided in the operation unit 11 for the speaker 2 to use to give instructions for the process of connecting the videophone apparatus 1 to the line and the process of disconnecting the videophone apparatus 1 from the line.

The picture-data coding unit 90 is a block that indicates a coding unit used in sending picture data in the picture-data coding/decoding unit 17 in FIG. 22. Descriptions of the other blocks will be omitted because they duplicate blocks shown in FIG. 22.

A more detailed description of the picture-data coding unit 90 in FIG. 23 will now be given.

FIG. 24 is a block diagram showing the internal structure of the picture-data coding unit 90 in FIG. 23.

The internal structure of the picture-data coding unit 90 in FIG. 24 also shows the picture signal coding system shown, for example, in ISO-IEC/JTC1/SC29/WG11 MPEG 92/NO245 Test Model 2.

The picture-data coding unit 90 in FIG. 24 comprises a subtractor 52, a DCT (discrete cosine transform) circuit 53, a quantizing circuit 54, a variable-length coding circuit 55, a transmit buffer 56, a dequantizing circuit 61, an IDCT (inverse discrete cosine transform) circuit 62, an adder 63, a memory circuit 64, a switching circuit 65, and a motion compensation and prediction circuit 66.

On instruction from the system control unit 15, a signal 71 (a digital picture signal) input to the picture-data coding unit 90 from the imaging unit 13 is input to the first input unit (1) of the subtractor 52, the first input unit (1) of the motion compensation and prediction circuit 66, and the second input unit (2) of the quantizing circuit 54. The output 72 of the subtractor 52 is input to the DCT circuit 53; the output 73 of the DCT circuit 53 is input to the first input unit (1) of the quantizing circuit 54. The output 74 of the quantizing circuit 54 is input to the variable-length coding circuit 55 and is also input to the dequantizing circuit 61. The output 75 of the variable-length coding circuit 55 is input to the transmit buffer 56. The output from the first output unit <1> of the transmit buffer 56 is output to the transmission control unit 18; the output 77 from the second output unit <2> of the transmit buffer 56 is input to the third input unit (3) of the quantizing circuit 54.

The output 81 of the dequantizing circuit 61 is input to the IDCT circuit 62; the output 82 of the IDCT circuit 62 is input to the first input unit (1) of the adder 63. The output 83 of the adder 63 is input to the first input unit (1) of the memory circuit 64; the output 84 of the memory circuit 64 is input to the second input unit (2) of the motion compensation and prediction circuit 66 and the first input unit (1) of the switching circuit 65. The output from the first output unit <1> of the motion compensation and prediction circuit 66 is input to the second input unit (2) of the memory circuit 64.

In addition, a zero signal is furnished to the second input unit (2) of the switching circuit 65, and the output 87 from the second output unit <2> of the motion compensation and prediction circuit 66 is input to the third input unit (3) of the switching circuit 65. The output 85 of the switching circuit 65 is input to the second input unit (2) of the subtractor 52 and the second input unit (2) of the adder 63.

The videophone system and videophone apparatus shown in FIGS. 22 to 24 operate as follows.

A case will be described in which, for example, speaker 2 (Mr. A) uses videophone apparatus 1 to call speaker 22 (Mr. B), who is at videophone apparatus 21.

First, when the line-connect/disconnect key 11a in the operation unit 11 shown in FIG. 23 is operated by speaker 2, the system control unit 15 connects videophone apparatus 1 to the communication network 40 by means of the transmission control unit 18, line interface unit 19, and so on.

Next, speaker 2 designates the dial number of speaker 22 by means of dial keys or the like (not visible), and a communication line is thereby connected between videophone apparatus 1 and videophone apparatus 21.

Whereupon, a picture of the far-end speaker 22 is displayed on the monitor screen 12a in the display unit 12 of videophone apparatus 1, together with the speaker's background 23, and a picture of speaker 2 is displayed on the monitor screen 12b in the display unit 12 of videophone apparatus 21, together with the speaker's background 3. Mutual sending and receiving of the pictures and voices of speaker 2 and speaker 22 thus becomes possible.

A case will also be described in which, for example, speaker 2 (Mr. A), who was using videophone apparatus 1 to converse with speaker 22 (Mr. B) at videophone apparatus 21, terminates the communication.

When the line-connect/disconnect key 11a in the operation unit 11 shown in FIG. 23 is operated by speaker 2, the system control unit 15 disconnects the communication line that was established between videophone apparatus 1 and the communication network 40 by means of the transmission control unit 18, line interface unit 19, and so on.

Whereupon, the picture of the far-end speaker 22 that was being displayed together with the speaker's background 23 on the monitor screen 12a of the display unit 12 of videophone apparatus 1 disappears, and the picture of the speaker 2 that was being displayed together with the speaker's background 3 on the monitor screen 12b of the display unit 12 of videophone apparatus 21 disappears simultaneously. Communication between speaker 2 and speaker 22 thereby terminates.

The operation of the above-described picture-data coding unit 90 will be explained only briefly, because it is standardized by organizations such as the ISO-IEC as described above. To reduce redundancy in the time-axis direction in the input signal 71 input from the imaging unit 13, that is, the picture data imaged in videophone apparatus 1, a subtraction process is performed in the subtractor 52 to obtain the inter-picture difference with the picture data output through the motion compensation and prediction circuit 66. A DCT (discrete cosine transform) in the spatial-axis directions is performed in the DCT circuit 53 on the difference signal (output 72) output from the subtractor 52. The discrete-cosine-transformed difference signal (DCT coefficients; output 73) output from the DCT circuit 53 is quantized in the quantizing circuit 54, and after the quantized signal (output 74) has been variable-length coded in the variable-length coding circuit 55, it is output through the transmit buffer 56 to the transmission control unit 18.

As described above, the imaged picture data are coded and transmitted as a signal with a small amount of information by means of information compression by the DCT (discrete cosine transform), quantization, and variable-length coding. Moreover, the receiving side is adapted to obtain the original amount of information by decoding the information-compressed signal. In a videophone system, this enables pictorial communication over lines that conventionally carried only voice communication.

In contrast to telephone apparatus that sent and received only voice signals over a telephone line, a videophone apparatus as described above could be said to be a telephone apparatus that can also send and receive pictures, by transmitting signals coded using information-compression technology on the transmitting side, and decoding the received signals on the receiving side. Because it can also send and receive pictures, a videophone apparatus has the advantage that one can converse with a party who is far away while seeing the party's face, but there are problems related to privacy protection that arise because the apparatus is a videophone apparatus.

For example, when the user on the sending side makes a call and the user on the receiving side picks up the handset, as soon as the line is connected, the other party's face is displayed on the monitor screen of the videophone apparatus on both the sending side and the receiving side. Usually, however, the user on the receiving side is not expecting to be called and is not prepared, so that user's clothing or hairstyle may be in disarray, or it may happen that the surroundings of the user on the receiving side are untidy. From the standpoint of privacy protection, it is not pleasing to the user on the receiving side to have the above sort of scene displayed on the monitor screen on the sending side.

Also, when a conversation using a videophone apparatus is placed on hold to call another person or hunt for reference materials, for example, the voice is placed on hold, but the conditions on the holding side are displayed on the monitor screen of the other party's videophone apparatus. The actions of the user on the holding side, who may be calling to a person in the same room or an adjacent room or elsewhere, or hunting for materials, are not a meaningful display to the person watching the monitor screen of the other videophone apparatus, and they are a display of background or actions that the user on the holding side does not want to let another person see. Accordingly, from the standpoint of privacy protection, it is not pleasing to the user on the holding side to have the above sort of conditions displayed on the other party's monitor screen.

To eliminate problems such as the above, one might consider not transmitting picture data immediately after the line is connected, for example, or during a hold, but then the monitor screen of the videophone apparatus would become similar to a screen in the non-operating (power-off) state, making the user uncertain as to whether the communication line were connected or not, and causing him or her to suspect line trouble or a malfunction of the telephone set.

Furthermore, with a videophone apparatus, when the conversation ends and the line is disconnected, if the user on one side performs an operation that disconnects the line, the face that was being displayed on the other party's monitor screen suddenly ceases to be displayed (disappears), so the user of the videophone apparatus on the other side of the conversation receives a mild shock. Moreover, the user of the videophone apparatus on the other side of the conversation sometimes feels uneasy because he or she cannot tell whether the disappearance of the face from the monitor screen is a normal line disconnection due to the operation of the user on the other side, or is due to line trouble or a malfunction of the telephone set.

Also, even with an ordinary telephone apparatus that performs voice communication only, elderly people in particular sometimes feel that it is rude to make the other party aware that the line has been disconnected by being the first to hang up, so the party who hangs up first may be left with bad feelings. With a videophone apparatus, since not only the other party's voice but also the other party's face suddenly vanishes due to line disconnection, the act of hanging up first (disconnecting the line first) may be interpreted as even more rude then with a voice-only telephone. The user of a videophone apparatus who first disconnects the communication line may accordingly be left with extremely bad feelings, depending on that user's sense of customs and manners.

The present invention addresses the above problems.

SUMMARY OF THE INVENTION

An object of the present invention is to provide a videophone apparatus that can make the far-end videophone apparatus user aware that the line is connected by sending a processed picture instead of a live picture, in order to protect the privacy of the user on the picture-sending side at the beginning of a call, for example, or when a call is placed on hold.

Another object is to provide a videophone apparatus with which the videophone apparatus user can terminate a call with an easy conscience and without feeling badly afterwards, by having the face of the other party that was being displayed on the monitor screen disappear gradually when the line to the other party's videophone apparatus is disconnected.

The invented method of sending pictures from a first videophone apparatus to a second videophone apparatus during a call placed between the first videophone apparatus and the second videophone apparatus includes the steps of:

taking a live picture of the user of the first videophone apparatus;

sending the live picture to the second videophone apparatus during one part of the call;

generating a processed picture different from the live picture; and sending the processed picture to the second videophone apparatus during another part of the call.

In one aspect of the invention, the processed picture is prepared in advance and stored in a memory unit of the first videophone apparatus.

In another aspect of the invention, the processed picture is obtained by combining the live picture with a prepared picture stored in a memory unit in the first videophone apparatus. For example, part of the live picture may be combined with part of the prepared picture, the two parts being displayed separately in the processed picture. Alternatively, the live picture may be overlaid semi-transparently on the prepared picture. The combining ratio, e.g., the size ratio for the two parts, or the transparency ratio of the live picture, may be varied at, for example, the beginning of the call, the end of the call, the beginning of a period in which the call is placed on hold, or the end of a period in which the called is placed on hold.

In another aspect of the invention, the processed picture is obtained by increasing a quantization coefficient of the live picture, thereby producing a mosaic effect that disguises the live picture. The quantization coefficient, hence the cell size of the mosaic effect, may be varied at, for example, the beginning of the call, the end of the call, the beginning of a period in which the call is placed on hold, or the end of a period in which the call is placed on hold.

The invention also provides a videophone apparatus having an imaging unit that takes a live picture of a user and outputs live picture data, a picture-data coding/decoding unit that codes the live picture data for transmission on a communication line and decodes picture data received from the communication line, a display unit that displays the decoded picture data, and an operation unit by which the user enters instructions. The videophone apparatus additionally comprises a picture-data memory unit storing prepared picture data, a picture-data processing unit that combines the live picture data with the prepared picture data to generate combined picture data, and a system control unit that causes the combined picture data to be coded in place of the live picture data for transmission on the communication line, responsive to an instruction entered by the user.

The invention also provides another videophone apparatus having an imaging unit that takes a live picture of a user and outputs live picture data, a picture-data coding/decoding unit that codes the live picture data for transmission on a communication line and decodes picture data received from the communication line, a display unit that displays the decoded picture data, and an operation unit by which the user enters instructions. This videophone apparatus additionally comprises a quantization coefficient control unit that controls a quantization coefficient used by the picture-data coding/decoding unit in coding the live picture data, and a system control unit that causes the quantization coefficient control unit to alter the quantization coefficient responsive to an instruction entered by the user.

BRIEF DESCRIPTION OF THE DRAWINGS

In the attached drawings:

FIG. 6 is a drawing showing the changing aspect of the combining ratio of the live picture and the graphic picture over time when the line is connected;

FIGS. 7A to 7F are drawings showing actual examples of the monitor screen as the combining ratio changes with time when the line is connected;

FIGS. 9A to 9F are drawings showing actual examples of the monitor screen as the combining ratio changes with time when the line is disconnected;

FIGS. 16A to 16F are drawings showing actual examples of the monitor screen as the combining ratio changes with time when the line is disconnected in the second embodiment;

FIG. 24 is a block diagram showing the internal structure of the picture-data coding unit in FIG. 23.

DETAILED DESCRIPTION OF THE INVENTION

The invention will be described below on the basis of the illustrated embodiments.

Figure 1:
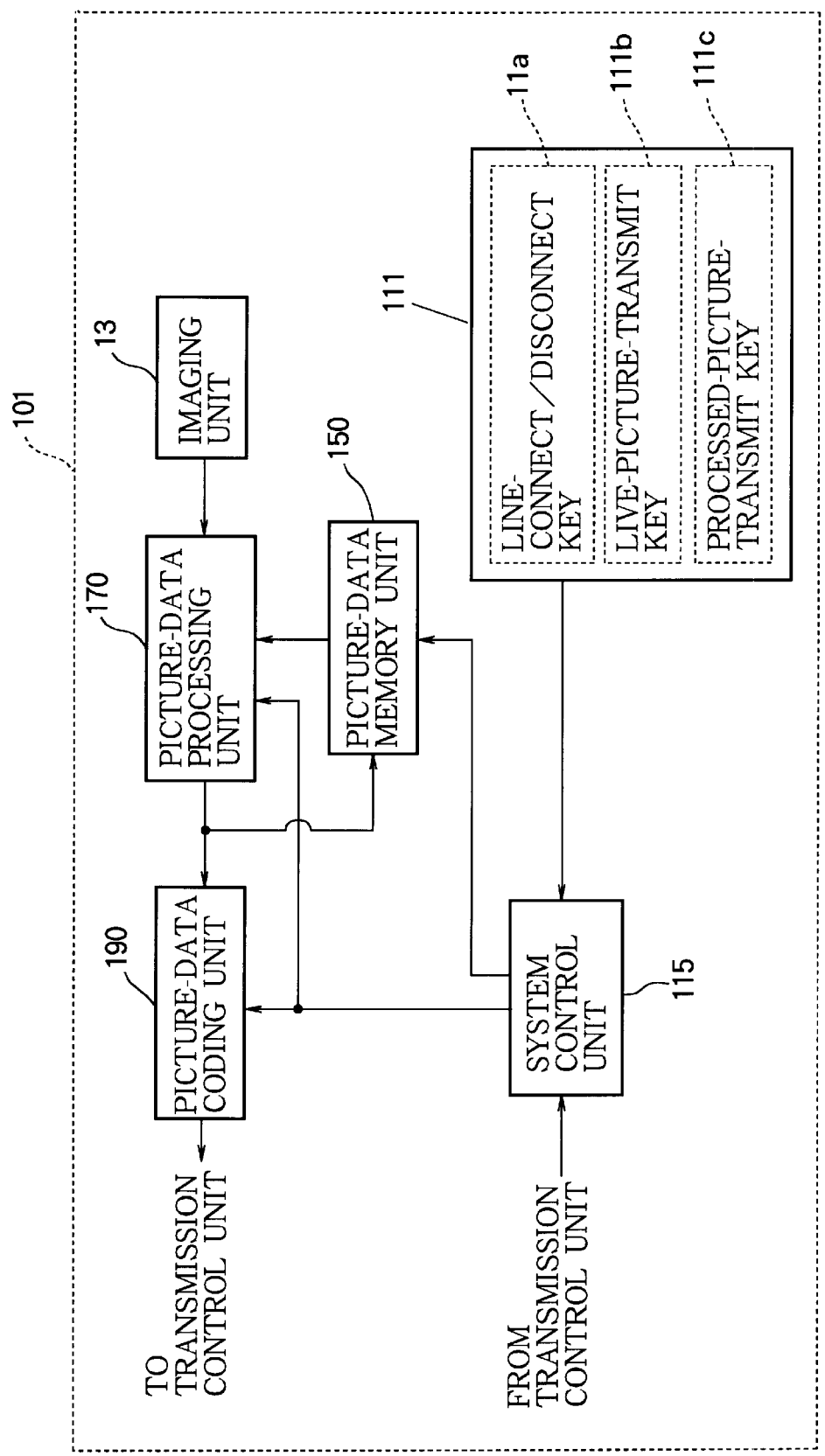
FIG. 1 is a drawing that shows selected blocks related to the process of coding a transmitted picture in a first videophone apparatus embodying the present invention.

FIG. 1 is a drawing that shows selected blocks related to the process of coding a transmitted picture in a first videophone apparatus embodying the present invention.

Figure 22:
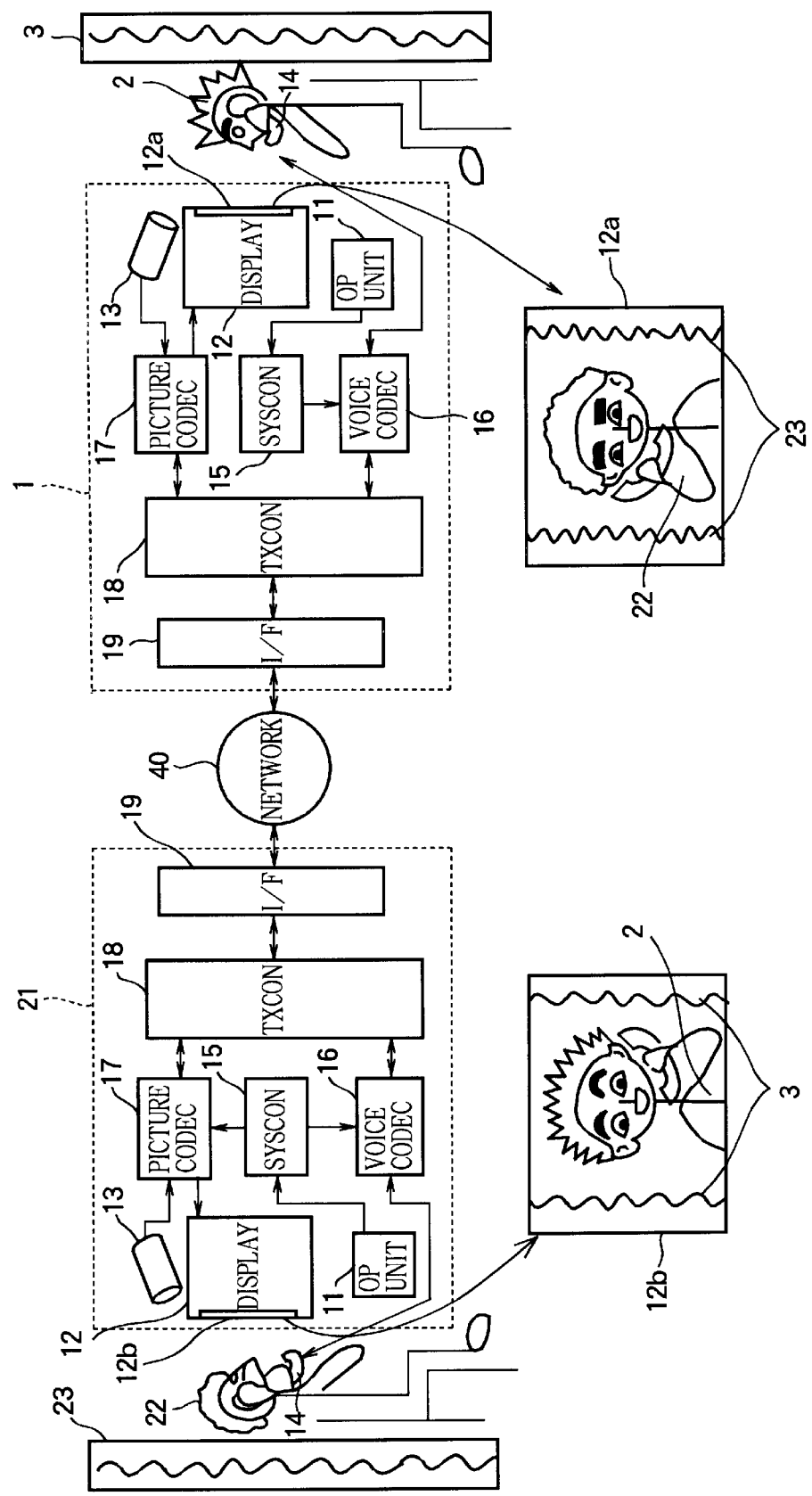
FIG. 22 is an overall block diagram showing a videophone system using conventional videophone apparatus.
Figure 23:
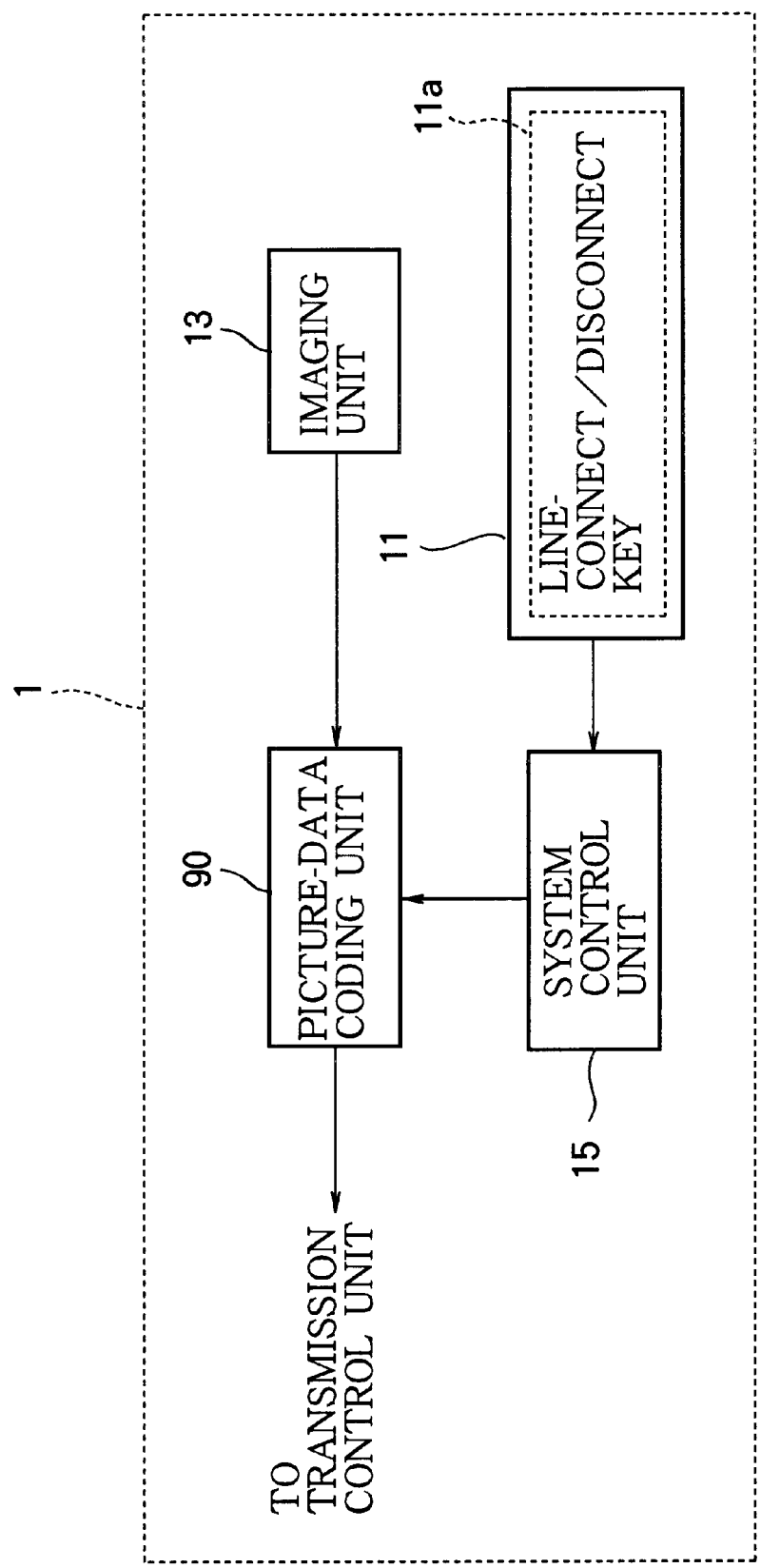
FIG. 23 is a drawing that shows selected blocks related to the process of coding the transmitted picture in the videophone apparatus in FIG. 22.

In FIG. 1, parts with the same functions as in the conventional videophone apparatus shown in FIG. 23 have the same reference characters, and redundant descriptions will be omitted. The overall structure of the videophone apparatus 101 of this embodiment is that of the conventional videophone apparatus 1 shown in FIG. 22 with those of the internal blocks that relate to the process of coding transmitted picture data replaced with the blocks shown in FIG. 1.

The main points of structural difference between the first embodiment, shown in FIG. 1, and the conventional example shown in FIG. 23 are that: in the videophone apparatus 101 in FIG. 1, a picture-data processing unit 170 that performs processes such as combining picture data is provided between the imaging unit 13, which is a CCD camera or the like, and the picture-data coding unit 190; a picture-data memory unit 150 is provided to store picture data processed in the picture-data processing unit 170; and a live-picture-transmit key 111b and a processed-picture-transmit key 111c are provided in the operation unit 111 to let the user choose whether to send the live picture from the videophone apparatus 101, or to send a picture processed by the picture-data processing unit 170.

The picture-data memory unit 150 is a picture-data memory unit with memory elements or the like storing a prepared picture for combining with the live picture in the picture-data processing unit 170. In this first embodiment, a still picture of the user, imaged in advance by the imaging unit 13, a picture of natural objects such as flowers and grass, a picture of scenery such as mountains or sea, an arbitrary graphic pattern, an arbitrary painting or photograph, an all-white picture, an all-gray picture, or an all-black picture etc. can be stored, according to the user's preference.

The picture-data processing unit 170 is a data-processing unit that can output picture data combining picture data prepared in advance in the picture-data memory unit 150 with live picture data input from the imaging unit 13, while making various alterations according to the instructions of the system control unit 115. The output of the picture-data processing unit 170 is also input to the picture-data memory unit 150 so that a still picture imaged in advance by the imaging unit 13, or picture data in which image processing has been performed on that still picture, can be stored in the picture-data memory unit 150. The detailed internal structure of the picture-data processing unit 170 will be described later using FIGS. 3 to 5.

The live-picture-transmit key 111b provided in the operation unit 111 is a processing selection key for sending the live picture when, for example, a call arrives or is placed on hold and the processed picture is designated to be sent, but the user's personal appearance such as clothing or hairstyle is in order and problems in the background have been cleared up.

In contrast to the live-picture-transmit key 111b, the processed-picture-transmit key 111c is a processing selection key for sending a processed picture when, for example, a call arrives or is placed on hold and the live picture is designated to be sent, but the user's personal appearance such as clothing or hairstyle is not in order or a problem is visible in the background.

The system control unit 115, in addition to control of the videophone apparatus 101 overall, controls the writing and reading of the stored contents in the picture-data memory unit 150, controls the combining process in the picture-data processing unit 170, and controls the coding process of the picture data in the picture-data coding unit 190, following instructions input from the operation unit 111 and line-state notifications input from the transmission control unit 18. The detailed internal structure of the system control unit 115 will be described later, using FIG. 2.

The picture-data coding unit 190 is a picture-data coding unit that does information compression of picture data to create a signal with a smaller amount of information, by performing such processing as a DCT (discrete cosine transform), quantization, and variable-length coding. The picture-data coding unit 190 is a block indicating the coding unit used in transmitting picture data in the picture-data coding/decoding unit 17 in FIG. 22. The detailed internal structure of the picture-data coding unit 190 will be described later, using FIG. 5.

Figure 2:
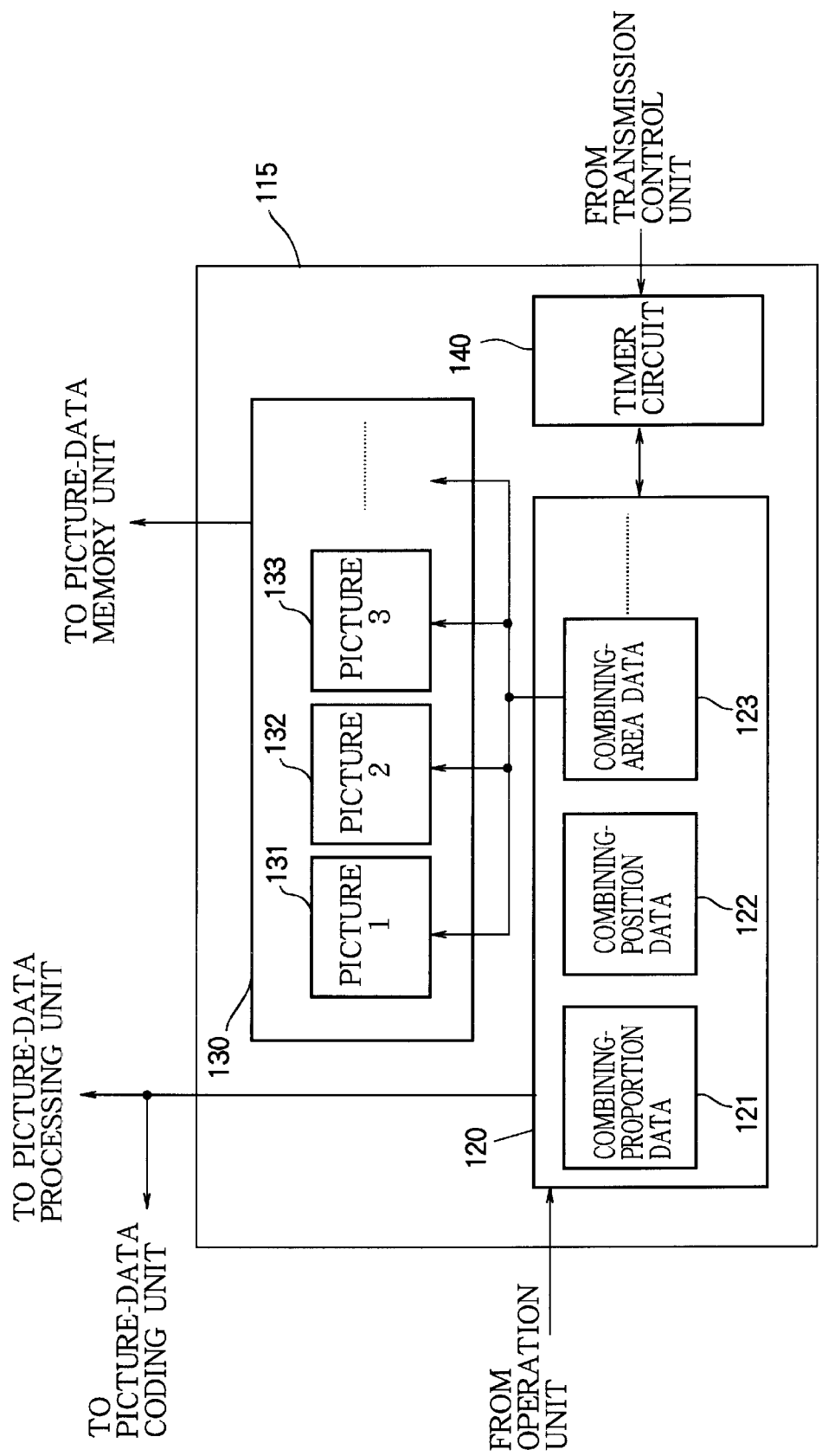
FIG. 2 is a block diagram showing the internal structure of the system control unit in FIG. 1.

FIG. 2 is a block diagram showing the internal structure of the system control unit in FIG. 1.

The system control unit 115 in FIG. 2 comprises a picture-combining control circuit 120 that controls the picture-combining process in the picture-data processing unit 170, an internal memory circuit 130 storing an arbitrary graphic picture, landscape picture, or the like, and a timer circuit 140 that measures elapsed time from the input timing of the line-connect/disconnect key 11a in the operation unit 111 or the line-connect/disconnect timing from the transmission control unit 18, or elapsed time from a start-of-hold or end-of-hold operation.

The picture-combining control circuit 120 stores combining conditions such as combining-proportion data 121 determining the proportion in which, for example, the live picture is combined with a graphic picture displayed on the full monitor screen, combining-position data 122 determining the position at which, for example, the live picture is inserted into a graphic picture displayed on the full monitor screen, and combining-area data 123 determining the area in which, for example, the live picture is inserted into a graphic picture on the full monitor screen.

The internal memory circuit 130 stores first picture data 131 of, for example, a graphic picture with a geometrical pattern, second picture data 132 of, for example, a graphic picture with slanting lines, third picture data 133 of, for example, a graphic picture with a checkerboard pattern, and so on. These picture data can be used to create the picture data stored in the picture data memory unit 150.

Figure 3:
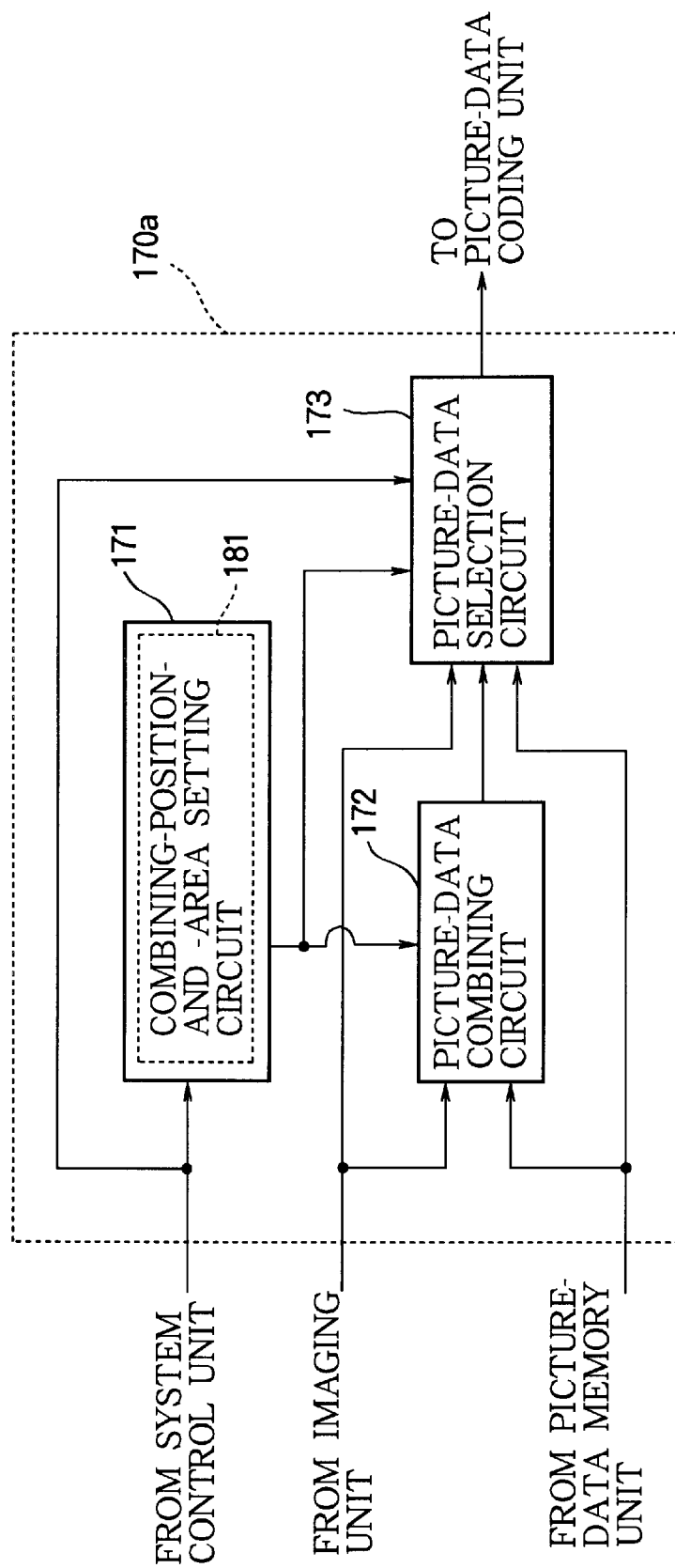
FIG. 3 is a block diagram showing an example of the internal structure of the picture-data processing unit.

FIG. 3 is a block diagram showing an example of the internal structure of the picture-data processing unit.

The picture-data processing unit 170a of FIG. 3 has: a parameter setting circuit 171 that sets the combining parameters of, for example, a graphic picture and the live picture on instruction from the system control unit 115; a picture-data combining circuit 172 that combines and outputs the live picture data from the imaging unit 13 and, for example, graphic picture data from the picture-data memory unit 150 on instruction from the parameter setting circuit 171; and a picture-data selection circuit 173 selects one from among the live picture data from the imaging unit 13, graphic picture data, for example, from the picture-data memory unit 150, and the combined picture data from the picture-data combining circuit 172, on instruction from the system control unit 115 or the parameter setting circuit 171, and outputs the selected data to the picture-data coding unit 190.

In the parameter setting circuit 171 in the picture-data processing unit 170a there is also a combining-position-and-area setting circuit 181 that sets, for example, the position and area of the live picture when it is combined with graphic picture data in the picture data combining circuit 172.

Figure 4:
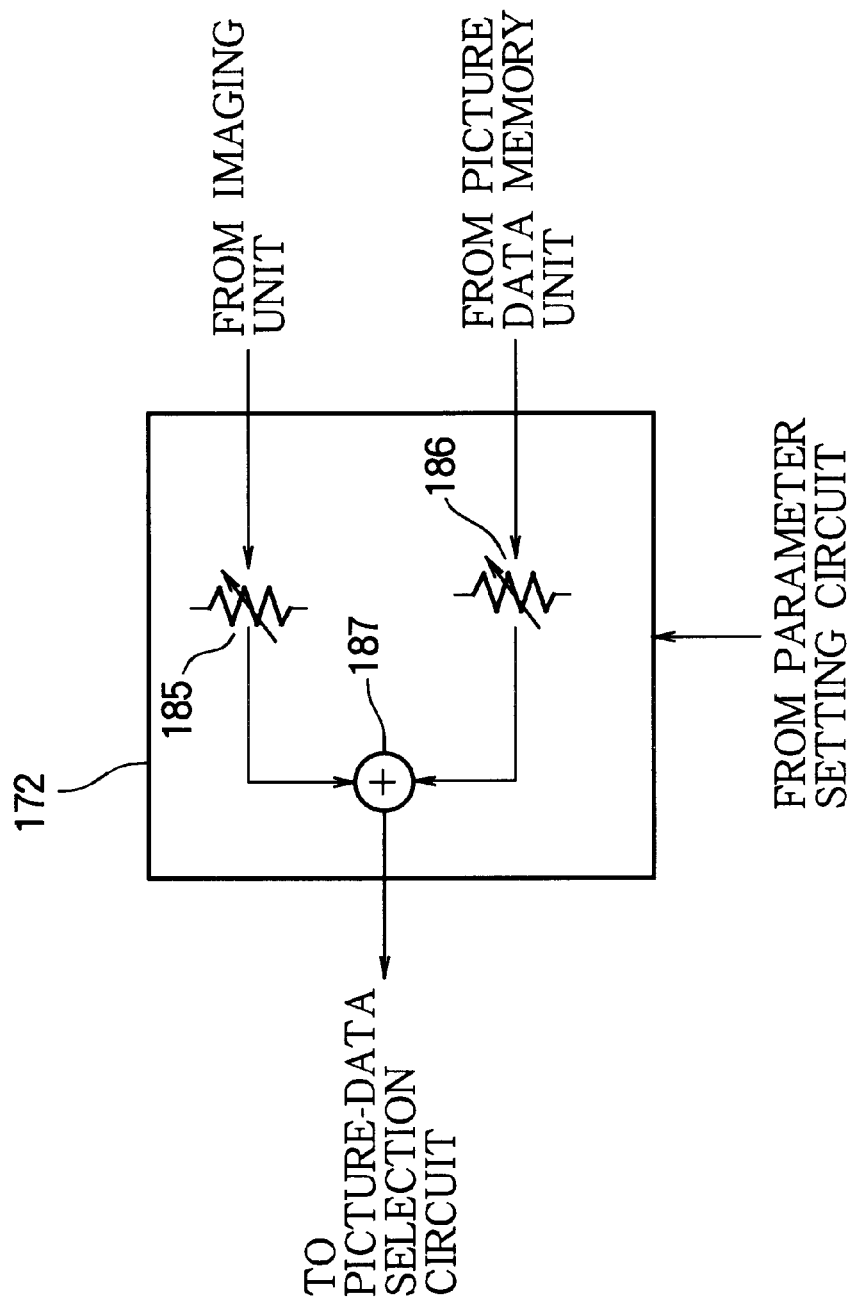
FIG. 4 is a block diagram showing the internal structure of the picture-data combining circuit in FIG. 3.

FIG. 4 is a block diagram showing the internal structure of the picture data combining circuit 172 shown in FIG. 3.

The picture-data combining circuit 172 in FIG. 4 has: a fader 185 that performs processing altering the position, area, and proportion in the full screen of the input signal from the imaging unit 13 and outputs it, on instruction from the parameter setting circuit 171; a fader 186 that performs processing altering the position, area, and proportion in the full screen of the input signal from the picture-data memory unit 150 and outputs it; and an adder 187 that adds and outputs the output of fader 185 and the output of fader 186. On instruction from the parameter setting circuit 171, the faders 185, 186 can also be controlled so as to combine the output of fader 185 and the output of fader 186 pixel by pixel.

Figure 5:
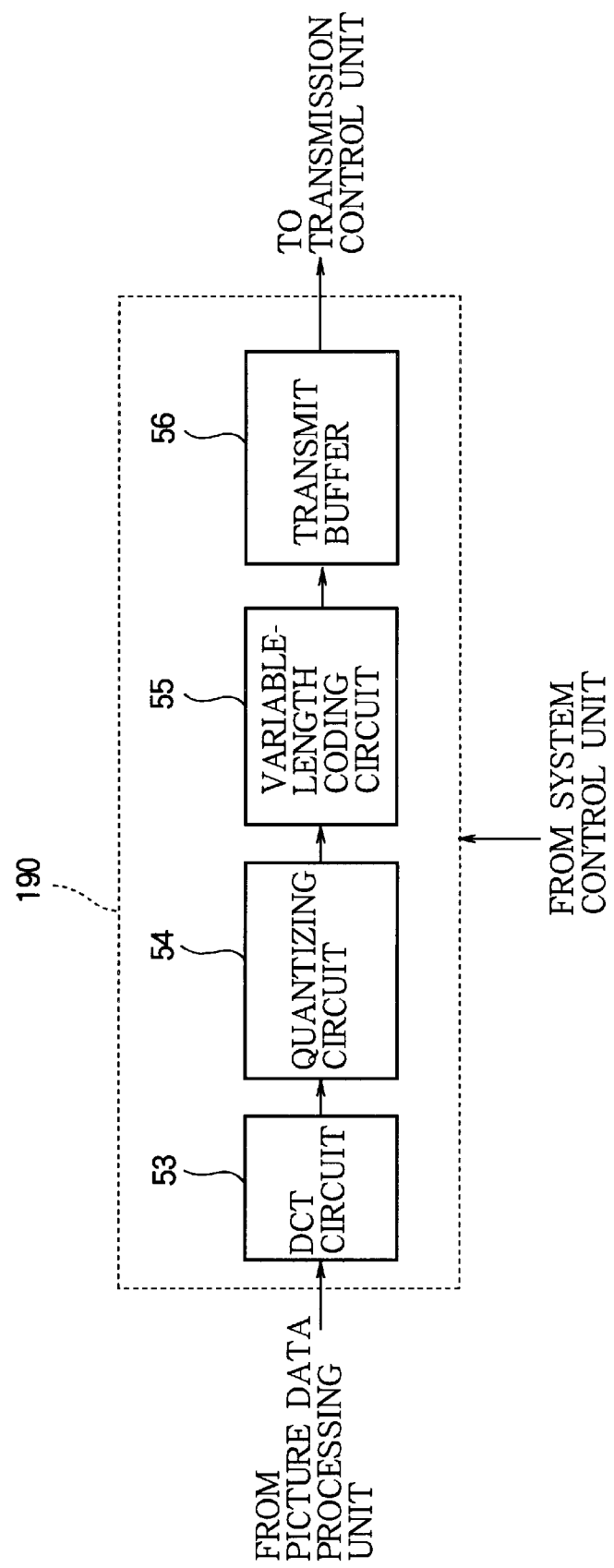
FIG. 5 is a block diagram showing the internal structure of the picture-data coding unit in FIG. 1.

FIG. 5 is a block diagram showing the internal structure of the picture-data coding unit 190 shown in FIG. 1.

The picture-data coding unit 190 in FIG. 5, like the picture-data coding unit 90 shown in FIG. 24, has a DCT (discrete cosine transform) circuit 53, a quantizing circuit 54, a variable-length coding circuit 55, and a transmit buffer 56.

On instruction from the system control unit 115, the signal input from the picture-data processing unit 170 is input to the DCT circuit 53, and the output of the DCT circuit 53 is input to the quantizing circuit 54. Similarly, the output of the quantizing circuit 54 is input to the variable-length coding circuit 55, the output of the variable-length coding circuit 55 is input to the transmit buffer 56, and the output of the transmit buffer 56 is output to the transmission control unit 18.

As noted above, when transmitted, the picture data combined by the picture-data processing unit 170 are coded into a signal with a smaller amount of information by information compression by the DCT (discrete cosine transform), quantization, and variable-length coding in the picture-data coding unit 190. Although not shown in FIG. 5, coding with further information compression is possible if, for example, a circuit comprising the subtractor 52 and motion compensation and prediction circuit 66 shown in FIG. 24 is added to the circuit shown in FIG. 5 in order to input a differential signal to the DCT circuit 53.

Next, the operation of the videophone apparatus 101 of the first embodiment will be described using FIGS. 6 to 10, with reference to the above FIGS. 1 to 5.

FIGS. 6 and 7A to 7F show one example of the operation of the first embodiment when the line is connected, for the case in which the live picture (the imaged picture) and a graphic picture are combined: FIG. 6 is a drawing showing the changing aspect of the combining ratio of the live picture and the graphic picture over time; FIGS. 7A to 7F are drawings showing actual examples of the monitor screen of the display unit 12 as the combining ratio changes with time.

The horizontal axis in FIG. 6 is the line connection time (t); the vertical axis is the proportion (%) that the area of the imaged picture occupies in the full-screen area of the combined picture.

In FIG. 6, when (t=Tf) the user of the videophone apparatus 101 on the calling side operates the line-connect/disconnect key 11a of the operation unit 111 and attempts a line connection with the communicating party (goes off-hook), the monitor screen of the display unit of the videophone apparatus 101 is in the non-display state and nothing is displayed on the screen, as shown in FIG. 7A.

In FIG. 6, when (t=T0) the system control unit 115 of the videophone apparatus 101 receives a notification from the transmission control unit 18 that the line has been connected, a picture in which the area of a graphic picture is 100% is displayed on the monitor screen of the display unit of the videophone apparatus 101, as shown in FIG. 7B.

In FIG. 6, when, due to the elapse of line connection time, the line connection time t reaches T1, equal to ¼ of the entire switchover time from the graphic picture to the live picture, a picture in which the area of the imaged picture is 6.25% while the area of the graphic picture is 93.75% is displayed on the monitor screen of the display unit of the videophone apparatus 101, as shown in FIG. 7C. A picture in which the area ratio of the imaged picture is 6.25% is a picture in which the imaged picture has 25% of the vertical height and 25% of the horizontal width of the full monitor screen.

In FIG. 6, when, due to the elapse of line connection time, the line connection time t reaches T2, equal to ½ of the entire switchover time from the graphic picture to the live picture, a picture in which the area of the imaged picture is 25% while the area of the graphic picture is 75% is displayed on the monitor screen of the display unit of the videophone apparatus 101, as shown in FIG. 7D. A picture in which the area ratio of the imaged picture is 25% is a picture in which the imaged picture has 50% of the vertical height and 50% of the horizontal width of the full monitor screen.

In FIG. 6, when, due to the elapse of line connection time, the line connection time t reaches T3, equal to ¾ of the entire switchover time from the graphic picture to the live picture, a picture in which the area of the imaged picture is 56.25% while the area of the graphic picture is 43.75% is displayed on the monitor screen of the display unit of the videophone apparatus 101, as shown in FIG. 7E. A picture in which the area ratio of the imaged picture is 56.25% is a picture in which the imaged picture has 75% of the vertical height and 75% of the horizontal width of the full monitor screen.

In FIG. 6, when, due to the elapse of line connection time, the line connection time t reaches T4, equal to the entire switchover time from the graphic picture to the live picture, a picture in which the area of the imaged picture is 100% while the area of the graphic picture is 0% is displayed on the monitor screen of the display unit of the videophone apparatus 101, as shown in FIG. 7F.

Next, the operation when the user of the videophone apparatus 101 of the example shown in the above FIGS. 6 and 7A to 7F attempts to disconnect the line (goes on-hook) will be described.

Figure 8:
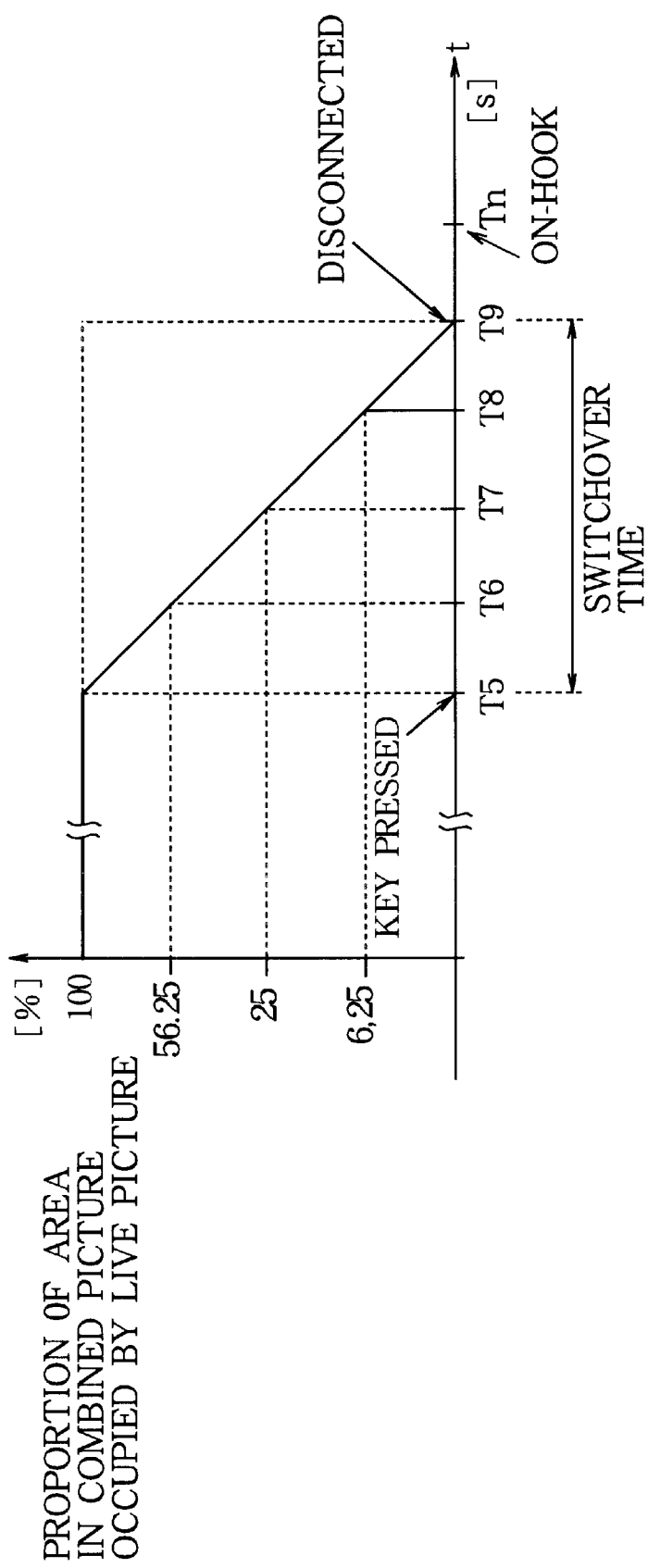
FIG. 8 is a drawing showing the changing aspect of the combining ratio of the live picture and the graphic picture over time when the line is disconnected.

FIGS. 8 and 9A to 9F show one example of the operation of the first embodiment when the line is disconnected, for the case in which the live picture (the imaged picture) and a graphic picture are combined: FIG. 8 is a drawing showing the changing aspect of the combining ratio of the live picture and the graphic picture over time; FIGS. 9A to 9F are drawings showing actual examples of the monitor screen of the display unit 12 as the combining ratio changes with time.

The horizontal axis in FIG. 8 is the line connection time (t); the vertical axis is the proportion (%) that the area of the imaged picture occupies in the full-screen area of the combined picture.

In FIG. 8, regarding the monitor screen of the display unit of the videophone apparatus 101 when (t=T5) the user of the videophone apparatus 101 on the calling side operates the line-connect/disconnect key 11a of the operation unit 111 and attempts a line disconnection with the communicating party (goes on-hook), a picture in which the area of the imaged picture is 100% while the area of the graphic picture is 0% is displayed on the monitor screen of the display unit of the videophone apparatus 101, as shown in FIG. 9A.

In FIG. 8, when, due to the elapse of line connection time, the line connection time t reaches T6, equal to ¼ of the entire switchover time from the live picture to the graphic picture, a picture in which the area of the imaged picture is 56.25% while the area of the graphic picture is 43.75% is displayed on the monitor screen of the display unit of the videophone apparatus 101, as shown in FIG. 9B.

In FIG. 8, when, due to the elapse of line connection time, the line connection time t reaches T7, equal to ½ of the entire switchover time from the live picture to the graphic picture, a picture in which the area of the imaged picture is 25% while the area of the graphic picture is 75% is displayed on the monitor screen of the display unit of the videophone apparatus 101, as shown in FIG. 9C.

In FIG. 8, when, due to the elapse of line connection time, the line connection time t reaches T8, equal to ¾ of the entire switchover time from the live picture to the graphic picture, a picture in which the area of the imaged picture is 6.25% while the area of the graphic picture is 93.75% is displayed on the monitor screen of the display unit of the videophone apparatus 101, as shown in FIG. 9D.

In FIG. 8, when (t=T9) the system control unit 115 of the videophone apparatus 101 receives a notification from the transmission control unit 18 that the line has been disconnected, a picture in which the area of a graphic picture is 100% is displayed on the monitor screen of the display unit of the videophone apparatus 101, as shown in FIG. 9E.

In FIG. 8, when, due to the elapse of line connection time, the line connection time t reaches Tn, which is in the continued on-hook state (the line non-connected state), the non-display state obtains and nothing is displayed on the screen, as shown in FIG. 9F.

A method of combining by determining positions in the imaged picture will be described here for the case in which a graphic picture is displayed on the monitor screen of the display unit in the combining process.

Figure 10:
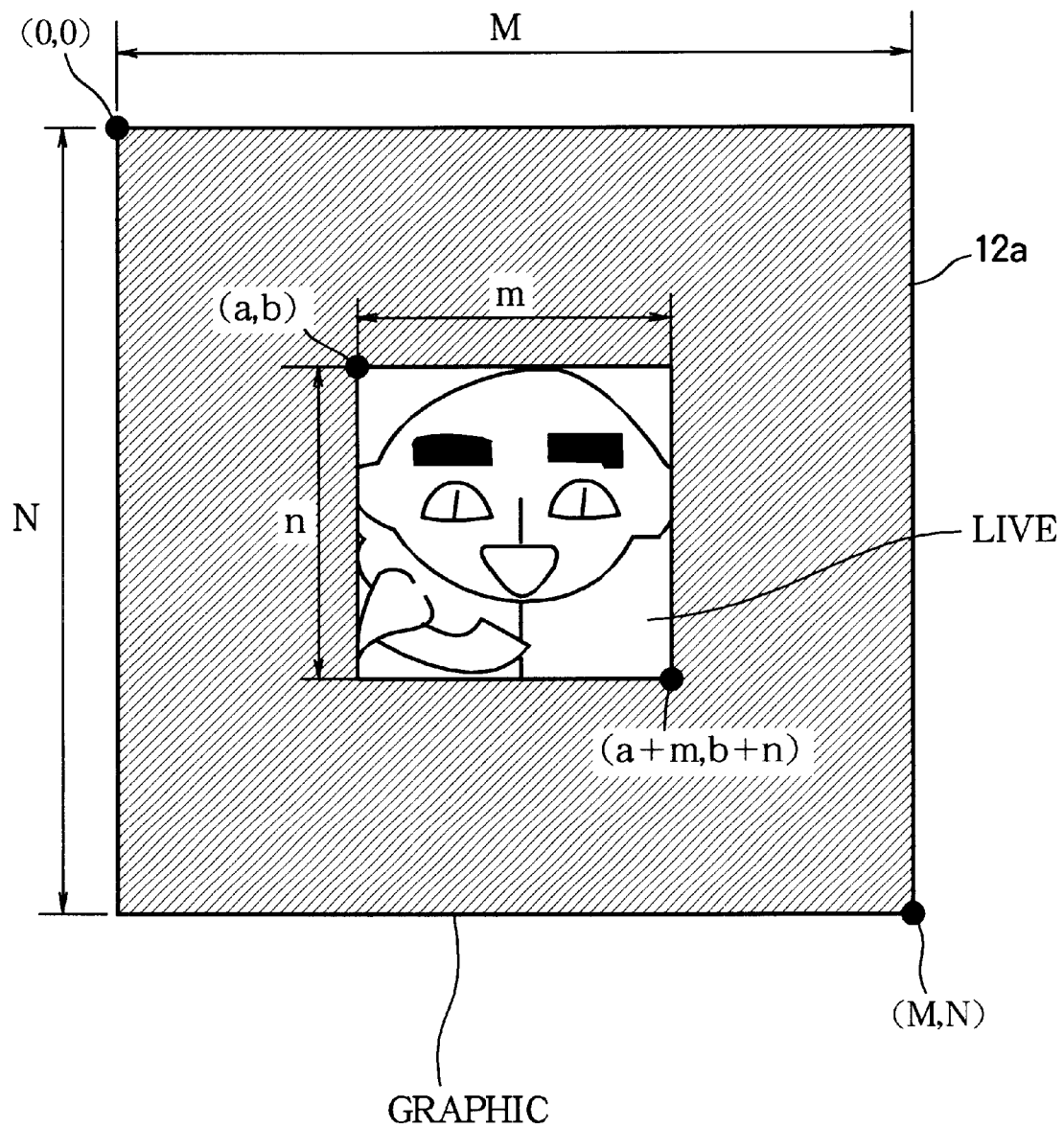
FIG. 10 is a drawing showing the position of a combining area in the monitor screen of the display unit.

FIG. 10 is a drawing showing the position of a combining area in the monitor screen of the display unit.

Dimension M in FIG. 10 is, for example, the width dimension of the monitor screen 12a of the display unit 12 shown in FIG. 22, and dimension N is the height dimension of the monitor screen 12a. The top left corner of the monitor screen 12a will have coordinates (0, 0), and the bottom right corner of the monitor screen 12a will have coordinates (M, N). That is, the monitor screen 12a has its origin point in the top left corner, at coordinates (0, 0).

Next, let the width dimension of the combining area displaying the imaged picture in the monitor screen 12a be m, and let the height dimension of the combining area be n. Let the top left corner of this combining area have coordinates (a, b), and let the bottom right corner of the combining area have coordinates (a+m, b+n). That is, the combining area has its origin point in the top left corner, at coordinates (a, b).

The hatched part in FIG. 10 is the part in which a graphic picture is displayed on the monitor screen 12a of the videophone apparatus of the first embodiment; the part displaying the face of the communicating party is the part displaying the imaged picture on the monitor screen 12a.

If the area of the full monitor screen is expressed by (0, 0)–(M, N), using the above coordinate positions, then the combining area, that is, the are of the imaged picture, can be expressed as (a, b)–(m+a, n+b).

From the display of a graphic picture in the full area (0, 0)–(M, N) of the monitor screen, the combined picture could be said to erase the graphic picture in the combining area (a, b)–(m+a, n+b), and display the imaged picture in the erased area (a, b)–(m+a, n+b).

Figure 11:
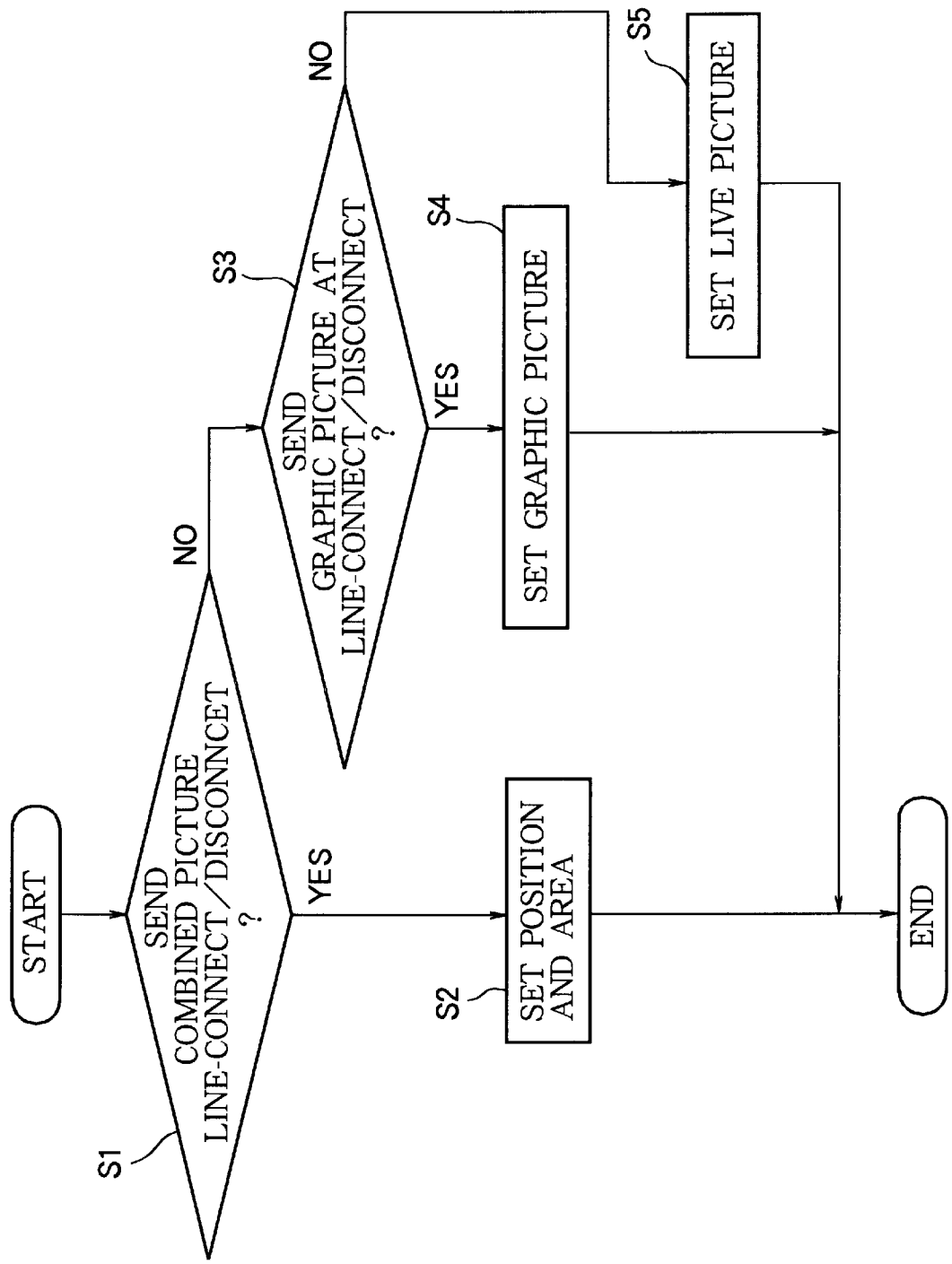
FIG. 11 is a flowchart showing the setting process of the parameter setting circuit in the picture-data processing unit of the first embodiment at the time of line connection or line disconnection.

FIG. 11 is a flowchart showing the setting process of the parameter setting circuit 171 in the picture-data processing unit 170a of the first embodiment at the time of line connection or line disconnection.

When the system control unit 115 receives a notification of line connection or disconnection from the transmission control unit 18 of the videophone apparatus 101, the system control unit 115 decides whether or not to send a combined picture to the other party, according to information set by the live-picture-transmit key 111b or processed-picture-transmit key 111c in the operation unit 111 (step S1).

If a combined picture is to be sent (step S1: Yes), the system control unit 115 outputs instructions to the combining-position-and-area setting circuit 181 in the parameter setting circuit 171, according to the settings of the operation unit 111, and the combining-position-and-area setting circuit 181, for example, determines the position of an area of the imaged picture in a graphic picture, and determines how that area will be changed with the elapse of line connection time (step S2).

If a combined picture is not to be sent(step S1: No), however, the system control unit 115 decides whether or not to send a graphic picture, according to the settings of the operation unit 111 (step S3). If a graphic picture is to be sent (step S3: Yes), the system control unit 115 outputs an instruction to the picture-data selection circuit 173 in the picture-data processing unit 170*a* to select the graphic picture data, and the picture-data selection circuit 173 selects and outputs the data of a graphic picture read from the picture-data memory unit 150 (step S4).

If a graphic picture is not to be sent (step S3: No), the system control unit 115 outputs an instruction to the picture-data selection circuit 173 in the picture-data processing unit 170*a* to select the imaged picture data, and the picture-data selection circuit 173 selects and outputs the data of the imaged picture received from the imaging unit 13 (step S5). When step S2, step S4, or step S5 has been completed, the setting processing is terminated.

Incidentally, the method of setting the position and area of the combining area by coordinate positions is not limited to that above: for example, the origin point may be set in the center of the monitor screen and the position and area of the combining area may be set by angles and absolute values. Also, regarding the combining area, one is not limited to setting a combining area of the imaged picture in a graphic picture: reversing this, for example, a combining area of the graphic picture may be set in the imaged picture. Furthermore, a combining area of the imaged picture is provided in a graphic picture in the first embodiment, but a picture of the user taken in advance may be combined with the picture now being imaged. Also, an arbitrary painting, photograph, illustration, or the like may be used instead of a graphic picture.

As described above, in the first embodiment, when the communication line is connected, the ratio (displayed area) of the combining area displayed in the full area of the monitor screen of the display unit is made to increase gradually responsive to the line connection time, whereby the sending to the other party's side of near-end conditions that should not be made known to the other party, as an imaged picture, by the picking up of the handset when the telephone apparatus rings, for example, is eliminated. Specifically, one can keep from showing the disarray of one's dress, the disarray of one's hairstyle, or the untidy appearance of one's room, which one would like to keep hidden from the other party, immediately after the line is connected, and can enlarge the picture area displaying the near-end aspect gradually, with the elapse of time. That is, one can protect one's privacy because scenes that one would like to keep hidden from the other party are not sent straight through to the other party.

Although the imaged picture is not sent to be displayed on the communicating party's full monitor screen as soon as the line is connected, a graphic picture or the like is sent instead, so it is not as if no picture were to be sent at all; the communicating party is made aware that the line is connected and that picture transmission is operating normally. That is, the communicating party is kept from suspecting line trouble or a malfunction of the videophone apparatus.

Depending on the programming of the system control unit 115, when the communication line is connected, the graphic picture may be left on the other party's full monitor screen until the local user's personal preparations have been completed and the room is in order; then the user can switch over to the live picture (the imaged picture) by operating the live-picture-transmit key 111*b* on the operation unit 111. That is, the user on the picture-sending side can be allowed to start sending his or her live picture when he or she actively wants to show it to the other party.

As noted above, a still picture (portrait) that the user has imaged in advance, or an arbitrary landscape picture, photograph, illustration, or the like may be used as the graphic picture, instead of a lifeless geometric pattern, so the other party's displeasure while waiting for a live picture display can be reduced.

Also, if a person places a call on hold while sending a live picture, by operating the processed-picture-transmit key 111*c* on the operation unit 111, for example, the person can avoid showing the other party the scene of a frantic search for another person or reference materials. When the person or materials have been found and communication is resumed, by operating the live-picture-transmit key 111*b* of the operation unit 111, the person can again communicate with the other party while sending the live picture.

When a person hangs up, the other party's surprise or annoyance at seeing the person's face disappear from the monitor screen is reduced, because the face disappears gradually. This occurs because the displayed area of the live picture decreases responsive to elapsed time from the operation of the line-connect/disconnect key. The other party is also reassured that the disconnection is normal, and is not due to a malfunction of the telephone set or communication network. Although the slow disappearance of the live picture may allow the other party to see the person who hangs up start to leave the videophone apparatus, or perform some other action that the person did not intend to transmit to the other party, the action is not transmitted clearly, because the live picture area is shrinking, and in any case the picture transmission soon ends.

For the same reason, the person who hangs up first need not feel that he or she has committed a breach of etiquette.

Figure 12:
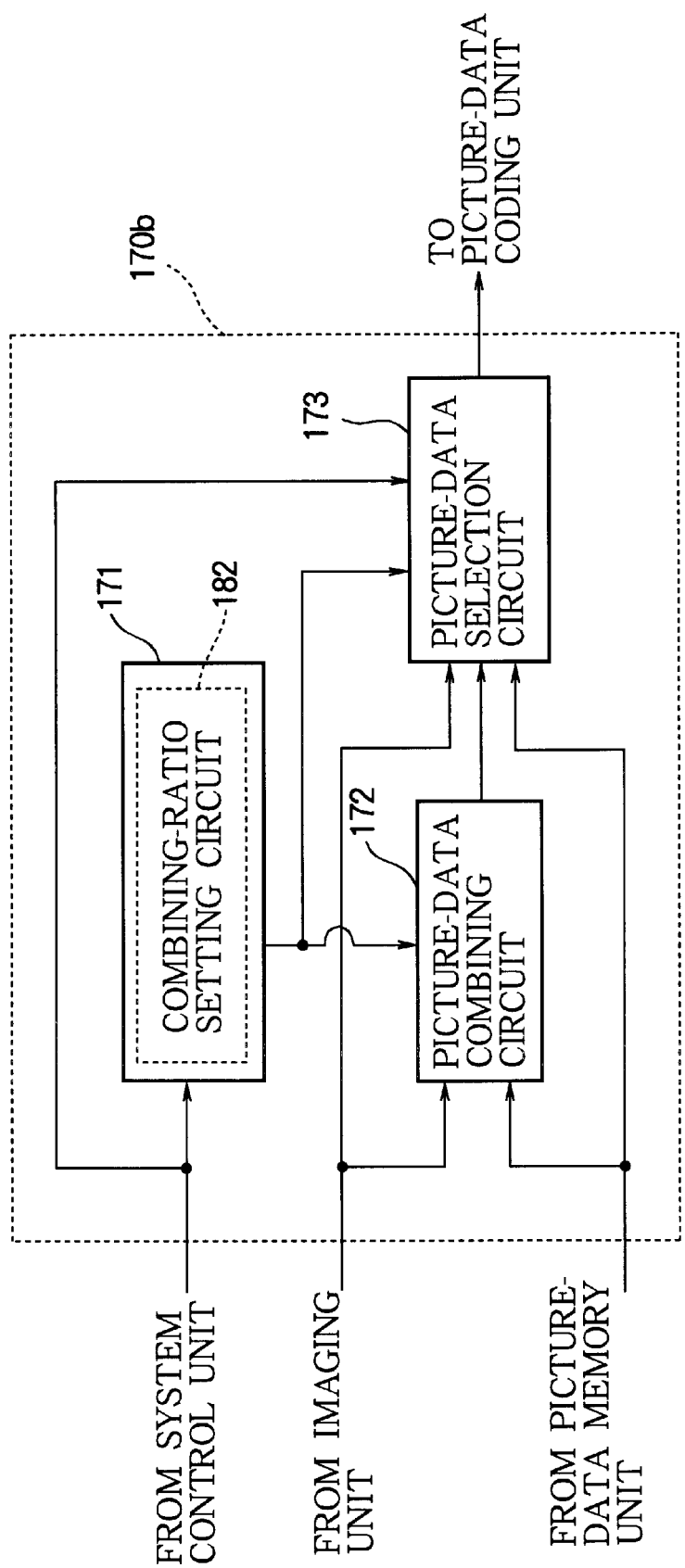
FIG. 12 is a block diagram showing the structure of the picture-data processing unit in the videophone apparatus of a second embodiment.

FIG. 12 is a block diagram showing the structure of the picture-data processing unit of a second videophone apparatus embodying the present invention. Except for the picture-data processing unit, the structure of this videophone apparatus is similar to that of the first embodiment. Accordingly, the description of this second embodiment will be carried out with reference to FIGS. 1, 2, 4, 5, and 22 as well as FIG. 12.

Only the internal part of the parameter setting circuit 171 in the picture-data processing unit 170*b* in FIG. 12 differs from the picture-data processing unit 170*a* in FIG. 3; the rest of the structure is similar to the picture-data processing unit 170*a*. Specifically, the picture-data processing unit 170*b* replaces the combining-position-and-area setting circuit 181 in picture-data processing unit 170*a* with a combining-ratio setting circuit 182.

Whereas the combining-position-and-area setting circuit 181 of the first embodiment was adapted to display a graphic picture, for example, on the monitor screen 12*a* of the display unit 12, set a combining area in that graphic picture, and display the imaged picture (the live picture) in that combining area, the combining-ratio setting circuit 182 sets a combining ratio or transparency ratio of the graphic picture and the imaged picture in the picture displayed on the monitor screen 12*a*, and has the graphic picture signal and the imaged picture signal combined pixel-by-pixel (dot-by-dot) in that ratio.

The combining-ratio setting circuit 182 also changes the combining ratio with the elapse of time. For example, with the elapse of line connection time, the monitor screen may change from displaying a 100% graphic picture in every dot to a combined picture in which the proportions of the displayed signals are 99% graphic picture and 1% live picture in every dot, then to a combined picture in which the proportions of the displayed signals are 98% graphic picture and 2% live picture, and so on until the monitor screen displays a 100% live picture.

If the proportion of dots of the combined picture occupied by dots of the imaged picture is R (0≦R≦1), for example, then the proportion of dots of the graphic picture can be expressed by 1−R. If the signal level of a dot in an arbitrary position on the monitor screen is C, and the signal levels of the dot of the imaged picture and the dot of the graphic picture corresponding to the dot at that position are A and B, then the signal level C of the dot of arbitrary position on the monitor screen is expressed by the equation C=(A×R)+B×(1−R).

The operation of the videophone apparatus when the combining ratio due to the combining-ratio setting circuit 182 of the second embodiment is changed will be described using FIGS. 13 to 16.

An overall operational flowchart of the videophone apparatus of the second embodiment will be omitted, because only the processing of step S2 of the first embodiment shown in FIG. 11 is changed, to a process of setting the dot-by-dot combining ratio; the operations differing from the first embodiment will be described below, using actual examples.

Figure 13:
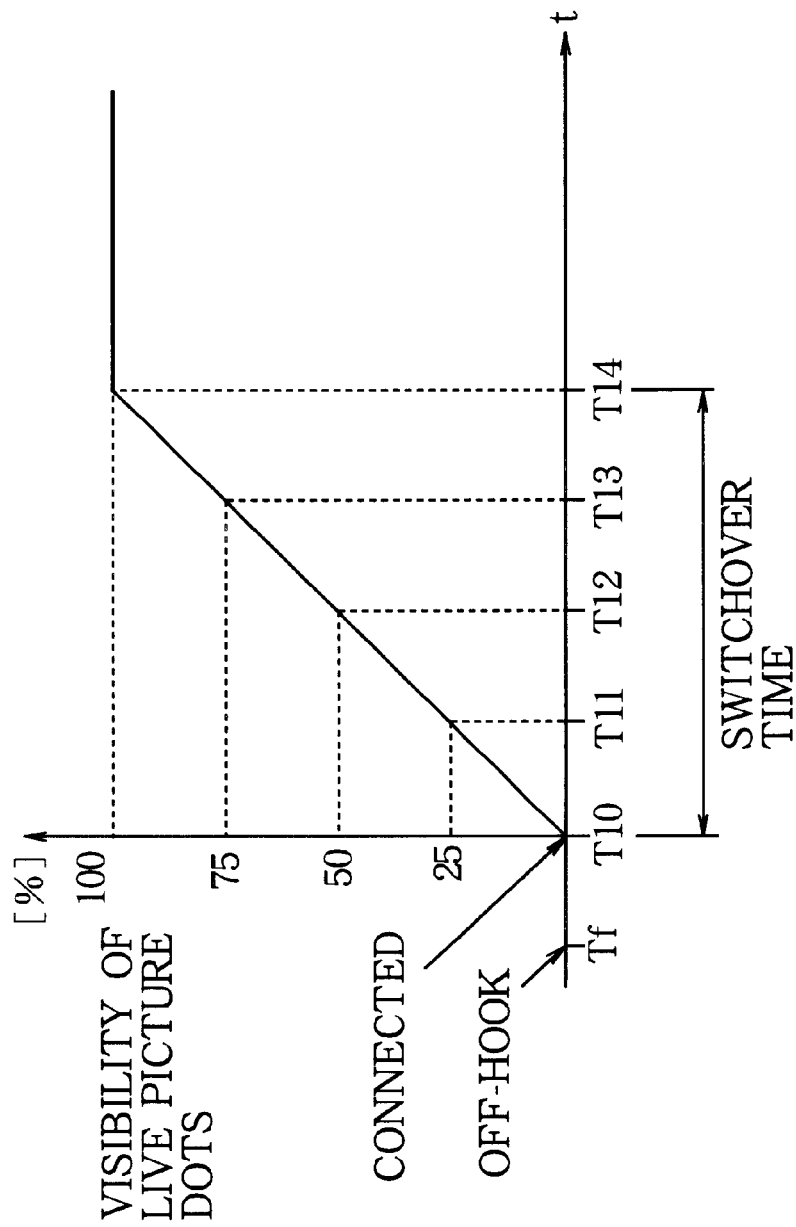
FIG. 13 is a drawing showing the changing aspect of the dot-by-dot combining ratio of the live picture and the graphic picture over time when the line is connected in the second embodiment.
Figure 14:
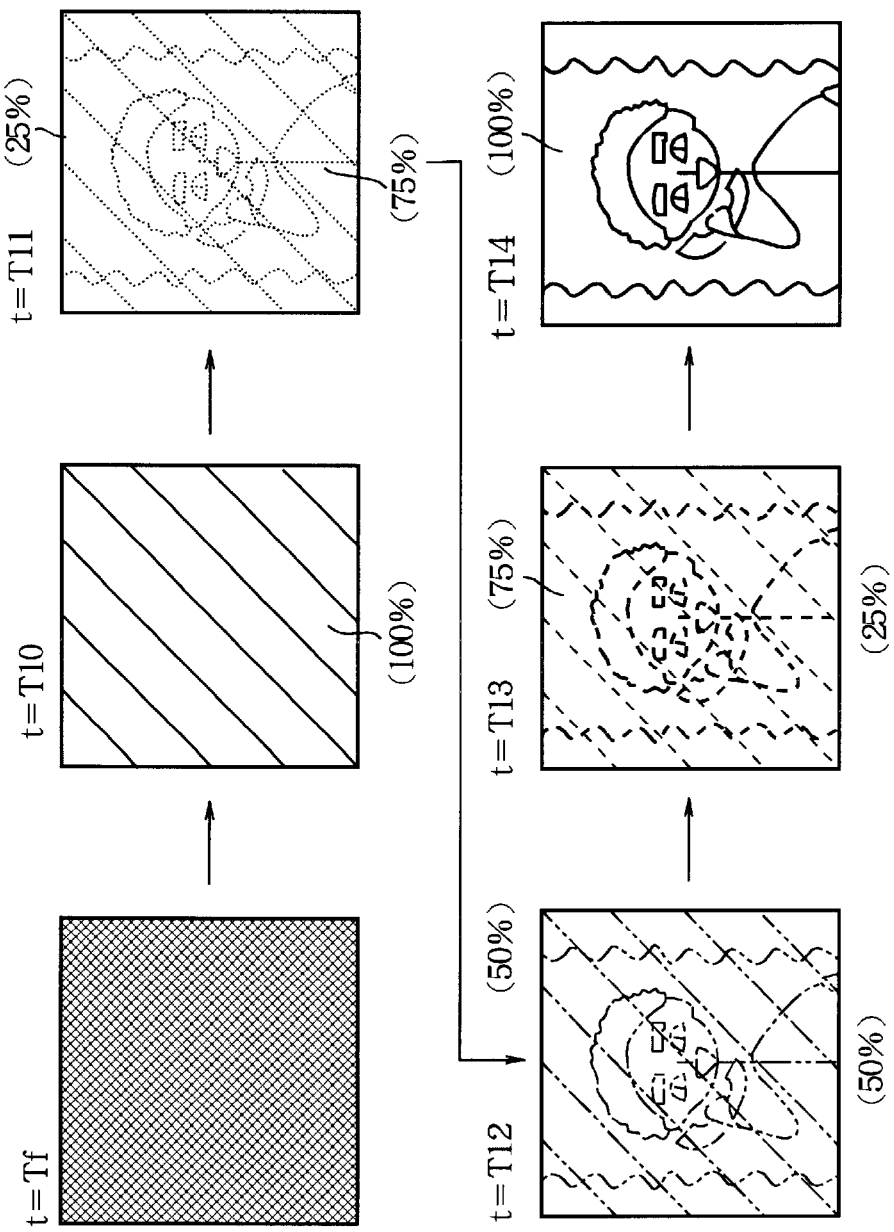
FIGS. 14A to 14F are drawings showing actual examples of the monitor screen as the combining ratio changes with time when the line is connected in the second embodiment.

FIGS. 13 and 14A to 14F show one example of the operation of the second embodiment when the line is connected, for the case in which the live picture (the imaged picture) and a graphic picture are combined: FIG. 13 is a drawing showing the changing aspect of the dot-by-dot combining ratio of the live picture and the graphic picture over time; FIGS. 14A to 14F are drawings showing actual examples of the monitor screen of the display unit 12 as the combining ratio changes with time.

The horizontal axis in FIG. 13 is the line connection time (t); the vertical axis is the proportion (%) that the dots of the imaged picture occupy in the dots of the combined picture.

In FIG. 13, when (t=Tf) the user of the videophone apparatus 101 on the calling side operates the lineconnect/disconnect key 11a of the operation unit 111 and attempts a line connection with the communicating party (goes off-hook), the monitor screen of the display unit of the videophone apparatus 101 is in the non-display state and nothing is displayed on the screen, as shown in FIG. 14A.

In FIG. 13, when (t=T10) the system control unit 115 of the videophone apparatus 101 receives a notification from the transmission control unit 18 that the line has been connected, a picture in which the dots of the graphic picture make up 100% is displayed on the monitor screen of the display unit of the videophone apparatus 101; that is, the graphic picture is displayed as is, the dots of the imaged picture not being combined at all, as shown in FIG. 14B.

In FIG. 13, when, due to the elapse of line connection time, the line connection time t reaches T11, equal to ¼ of the entire switchover time from the graphic picture to the live picture, a picture combined dot by dot, the dots of the imaged picture making up 25% while the dots of the graphic picture make up 75%, is displayed on the monitor screen of the display unit of the videophone apparatus 101, as shown in FIG. 14C.

In FIG. 13, when, due to the elapse of line connection time, the line connection time t reaches T12, equal to ½ of the entire switchover time from the graphic picture to the live picture, a picture combined dot by dot, the dots of the imaged picture making up 50% while the dots of the graphic picture make up 50%, is displayed on the monitor screen of the display unit of the videophone apparatus 101, as shown in FIG. 14D.

In FIG. 13, when, due to the elapse of line connection time, the line connection time t reaches T13, equal to ¾ of the entire switchover time from the graphic picture to the live picture, a picture combined dot by dot, the dots of the imaged picture making up 75% while the dots of the graphic picture make up 25%, is displayed on the monitor screen of the display unit of the videophone apparatus 101, as shown in FIG. 14E.

In FIG. 13, when, due to the elapse of line connection time, the line connection time t reaches T14, equal to the entire switchover time from the graphic picture to the live picture, a picture combined dot by dot, the dots of the imaged picture making up 100% while the dots of the graphic picture make up 0%, is displayed on the monitor screen of the display unit of the videophone apparatus 101, as shown in FIG. 14F.

Next, the operation when the user of the videophone apparatus 101 of the example shown in the above FIGS. 13 and 14A to 14F attempts to disconnect the line (goes on-hook) will be described.

Figure 15:
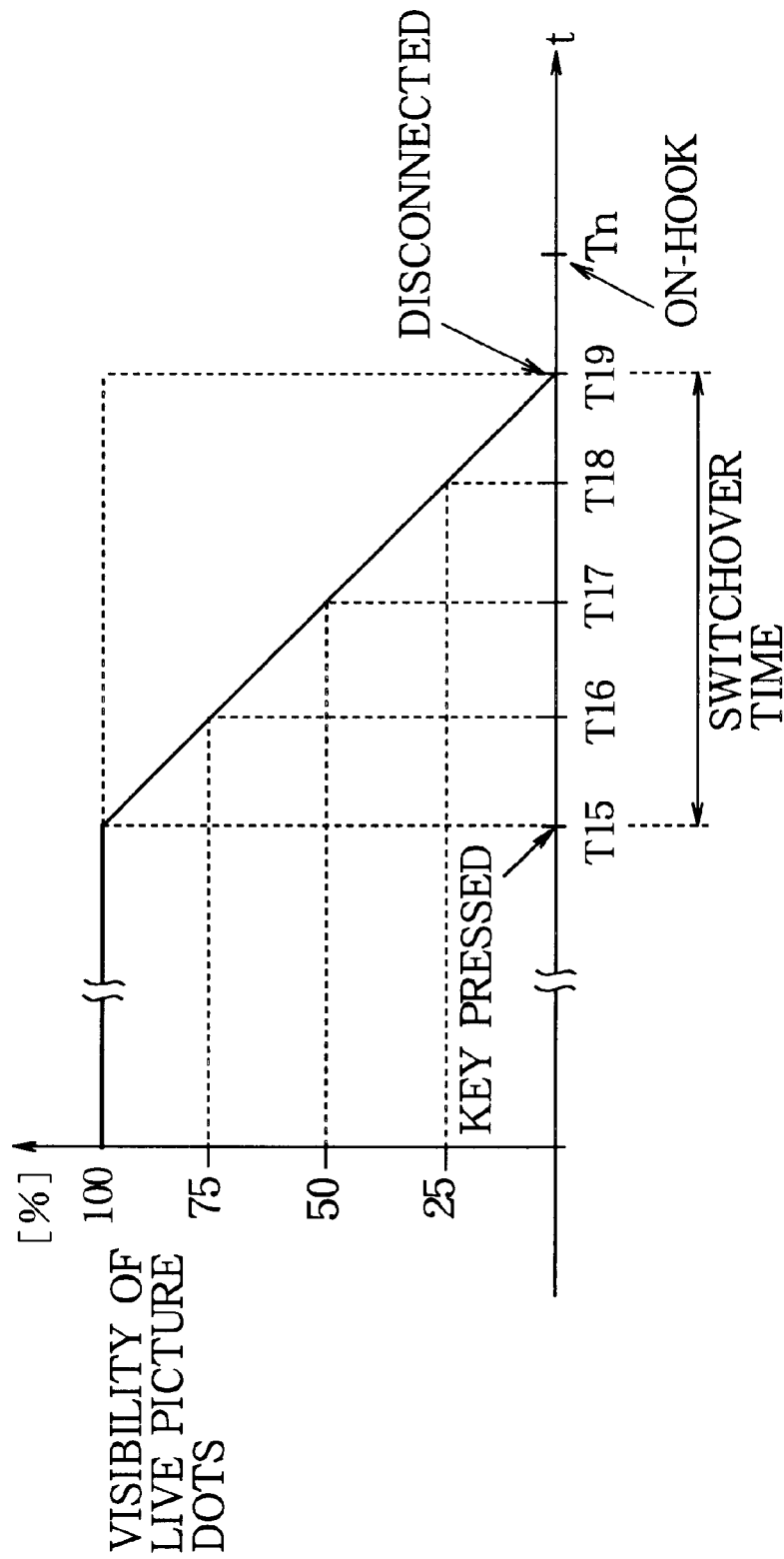
FIG. 15 is a drawing showing the changing aspect of the dot-by-dot combining ratio of the live picture and the graphic picture over time when the line is disconnected in the second embodiment.

FIGS. 15 and 16A to 16F show one example of the operation of the second embodiment when the line is disconnected, for the case in which the live picture (the imaged picture) and a graphic picture are combined dot by dot: FIG. 15 is a drawing showing the changing aspect of the dot-by-dot combining ratio of the live picture and the graphic picture over time; FIGS. 16A to 16F are drawings showing actual examples of the monitor screen of the display unit 12 as the dot-by-dot combining ratio changes with time.

The horizontal axis in FIG. 15 is the line connection time (t); the vertical axis is the proportion (%) that the dots of the imaged picture occupy in the dots of the combined picture.

In FIG. 15, regarding the monitor screen of the display unit of the videophone apparatus 101 when (t=T15) the user of the videophone apparatus 101 on the calling side operates the line-connect/disconnect key 11a of the operation unit 111 and attempts a line disconnection with the communicating party (goes on-hook), a picture in which the dots of the live picture make up 100% while the dots of the graphic picture make up 0% is displayed on the monitor screen of the display unit of the videophone apparatus 101, as shown in FIG. 16A.

In FIG. 15, when, due to the elapse of line connection time, the line connection time t reaches T16, equal to ¼ of the entire switchover time from the live picture to the graphic picture, a picture combined dot by dot, the dots of the imaged picture making up 75% while the dots of the graphic picture make up 25%, is displayed on the monitor screen of the display unit of the videophone apparatus 101, as shown in FIG. 16B.

In FIG. 15, when, due to the elapse of line connection time, the line connection time t reaches T17, equal to ½ of the entire switchover time from the live picture to the graphic picture, a picture combined dot by dot, the dots of the imaged picture making up 50% while the dots of the graphic picture make up 50%, is displayed on the monitor screen of the display unit of the videophone apparatus 101, as shown in FIG. 16C.

In FIG. 15, when, due to the elapse of line connection time, the line connection time t reaches T18, equal to ¾ of the entire switchover time from the live picture to the graphic picture, a picture combined dot by dot, the dots of the imaged picture making up 25% while the dots of the graphic picture make up 75%, is displayed on the monitor screen of the display unit of the videophone apparatus 101, as shown in FIG. 16D.

In FIG. 15, when (t=T19) the system control unit 115 of the videophone apparatus 101 receives a notification from the transmission control unit 18 that the line has been disconnected, a picture combined dot by dot, the dots of the imaged picture making up 0% while the dots of the graphic picture make up 100%, is displayed on the monitor screen of the display unit of the videophone apparatus 101, as shown in FIG. 16E.

In FIG. 15, when, due to the elapse of line connection time, the line connection time t reaches Tn, which is in the continued on-hook state (the line non-connected state), the non-display state obtains and nothing is displayed on the screen, as shown in FIG. 16F.

As described above, in the second embodiment, when the communication line is connected, the imaged picture is gradually displayed more clearly over the full area of the monitor screen of the display unit, overlaid semi-transparently on the graphic picture, because the displayed proportion of the dots of the imaged picture in relation to the dots of the graphic picture is made to increase gradually responsive to the line connection time, whereby as in the first embodiment, the sending to the other party's side of conditions on the near side that should not be made known to the other party, as an imaged picture, by the picking up of the handset when the telephone apparatus rings, for example, is eliminated. Accordingly, as in the first embodiment, one can protect one's privacy because conditions that one would like to keep hidden from the other party are not sent straight through to the other party, and the communicating party can be kept from worrying about line trouble or a malfunction of the videophone apparatus.

In the second embodiment, incidentally, the imaged picture can be made to fade in when the line is connected and fade out when the line is disconnected, by use of an all-black picture as the graphic picture, for example, reducing the difference between the monitor screen with a 100% graphic picture and the monitor screen that has been powered off and is in the non-display state, whereby the surprise experienced by the communicating party when the line is disconnected can be reduced.

Also, when a call is placed on hold while a party is communicating with another party while sending a live picture, by operating the processed-picture-transmit key 111c of the operation unit 111, for example, the party can blur the scene of the frantic search for another person or reference materials, to avoid showing it plainly. When the person or materials have been found and communication is resumed, by operating the live-picture-transmit key 111b of the operation unit 111, the party can again communicate with the other party while sending a clear live picture.

Also, in the second embodiment, when communication (communication with the other party while the live picture is being sent) is terminated, the imaged picture is gradually displayed more faintly and less clearly over the full area of the monitor screen of the display unit, overlaid on the graphic picture, and finally disappears, because the displayed proportion of the dots of the imaged picture in relation to the dots of the graphic picture is made to decrease gradually responsive to the time from operation of the line-connect/disconnect key of the operation unit 111. As in the first embodiment, since the face of the communicating party on the monitor screen does not suddenly disappear when the communicating party hangs up, the user of the videophone apparatus is less surprised and less annoyed, and is furthermore reassured that the line disconnection is normal, not a malfunction of the telephone set or communication network.

Also, in the second embodiment, as noted above, because the display proportion of the dots of the live picture in the total area of the monitor screen of the display unit is gradually reduced, the user who disconnects the communication line first can be left with fewer bad feelings.

The method of setting the combining ratios of the dots of the graphic picture and the dots of the live picture carried out by the combining-ratio setting circuit 182 is not limited to the method described above, that varies the combining ratios linearly; for example, the combining ratios may be varied according to the curve of a quadratic function or the like, or the dots of the live picture and a plurality of graphic pictures may be combined.

Figure 17:
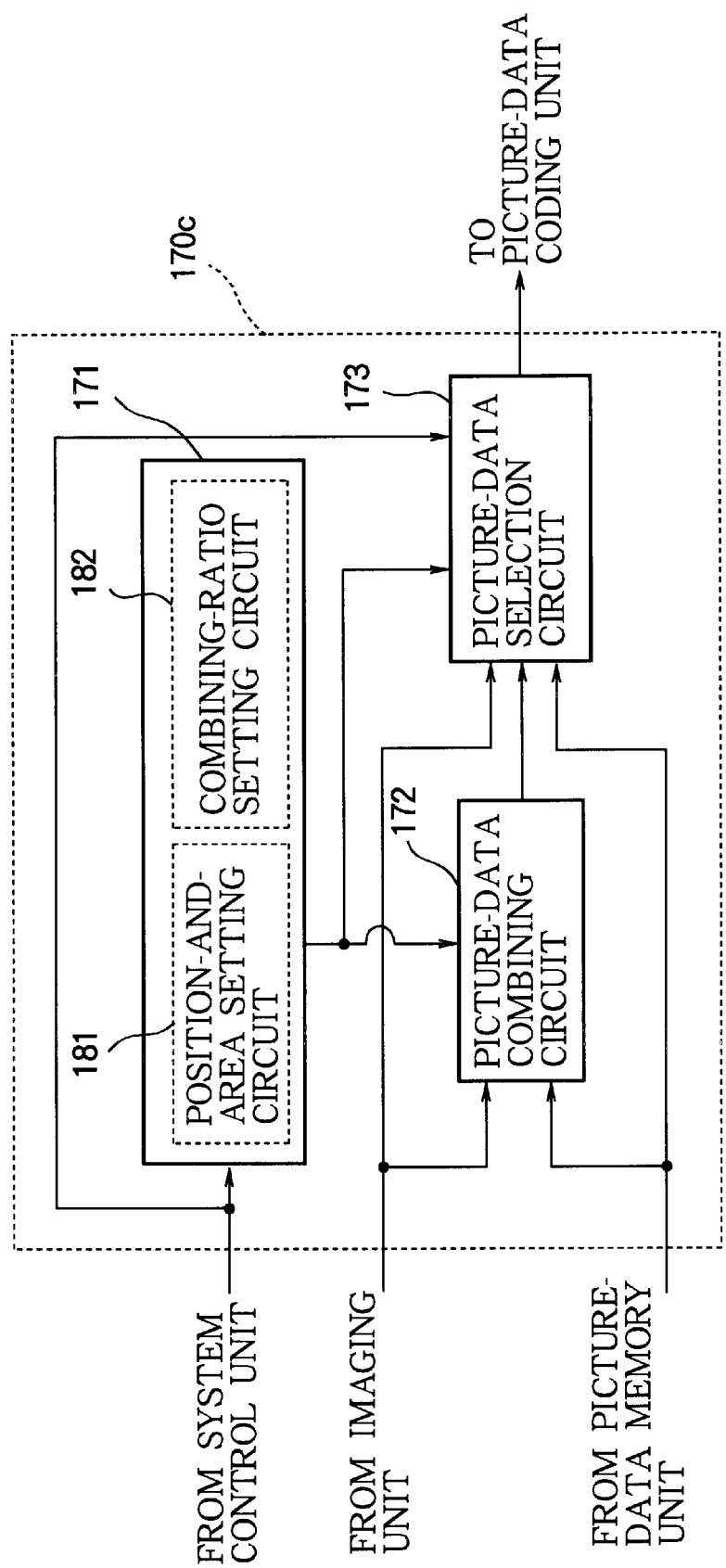
FIG. 17 is a block diagram showing the structure of the picture-data processing unit in the videophone apparatus of a third embodiment.

FIG. 17 is a block diagram showing the structure of the picture-data processing unit of a third videophone apparatus embodying the present invention. Except for the picture-data processing unit, the structure of the videophone apparatus of this third embodiment is similar to that of the preceding embodiments. Accordingly, the description of the third embodiment below will be carried out with reference to FIGS. 1 to 5, 12, and 22 as well as FIG. 17.

Only the internal part of the parameter setting circuit 171 in the picture-data processing unit 170c in FIG. 17 differs from the picture-data processing unit 170a in FIG. 3 or the picture-data processing unit 170b in FIG. 12; the rest of the structure is similar to the picture-data processing unit 170a or 170b. Specifically, the picture-data processing unit 170c includes both the combining-position-and-area setting circuit 181 of picture-data processing unit 170a and the combining-ratio setting circuit 182 of picture-data processing unit 170b in the parameter setting circuit 171.

The operations by the combining-position-and-area setting circuit 181 are as described in the first embodiment above; the operations by the combining-ratio setting circuit 182 are as described in the second embodiment above.

In the third embodiment, for example, the change of the dot-by-dot combining ratio described in the second embodiment can be applied to the picture displayed in the combining area described in the first embodiment. Specifically, a graphic picture is displayed on the monitor screen 12a of the display unit 12, a combining area is set in that graphic picture, the imaged picture (the live picture) is displayed in that combining area, and the graphic picture is combined pixel by pixel (dot by dot) with the imaged picture in that combining area, in the combining ratio set by the combining-ratio setting circuit 182, to create a combined picture.

Figure 18:
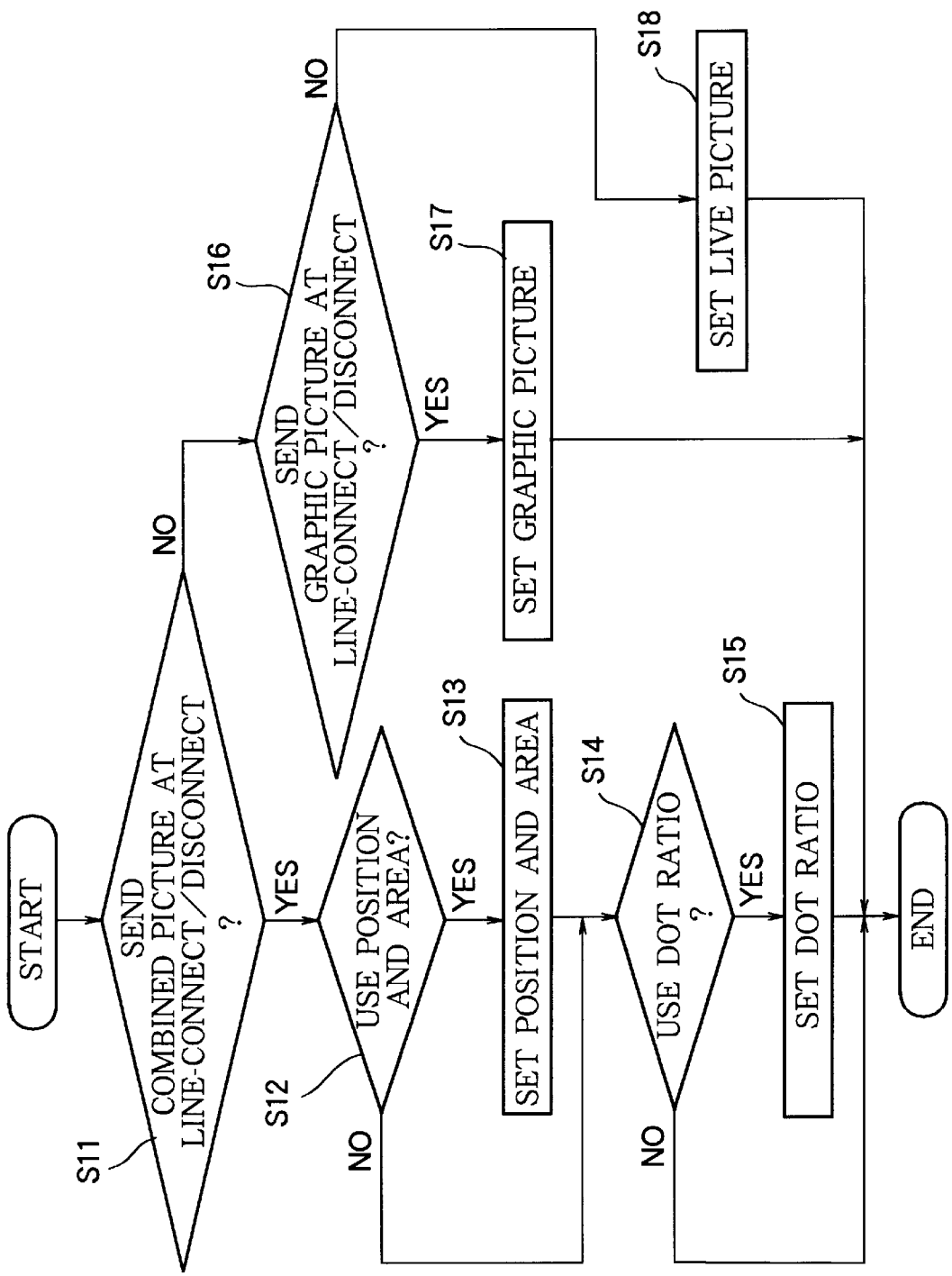
FIG. 18 is a flowchart showing the setting process of the parameter setting circuit in the picture-data processing unit of the third embodiment at the time of line connection or line disconnection.

FIG. 18 is a flowchart showing the setting process of the parameter setting circuit 171 in the picture-data processing unit 170c of the third embodiment at the time of line connection or line disconnection.

When the system control unit 115 receives a notification of line connection or disconnection from the transmission control unit 18 of the videophone apparatus 101, the system control unit 115 decides whether or not to send a combined picture to the other party, according to information set by the live-picture-transmit key 111b or processed-picture-transmit key 111c in the operation unit 111 (step S11).

If a combined picture is to be sent (step S11: Yes) the system control unit 115 determines whether to use position and area in the combining process as shown in the first embodiment, by inserting part of the imaged picture into the graphic picture, or part of the graphic picture into the imaged picture, according to the settings of the operation unit 111, (step S12). If position and area are to be used in the combining process (step S12: Yes), the system control unit 115 outputs an instruction to the combining-position-and-area setting circuit 181 in the parameter setting circuit 171, and the combining-position-and-area setting circuit 181, for example, sets the position of an area of the imaged picture in the graphic picture and determines how that area will be changed with the elapse of line connection time (step S13).

If position and area are not used in the combining process (step S12: No), the system control unit 115 decides whether or not to use a combining ratio to determine proportions of dots of the graphic picture and dots of the imaged picture in each dot on the monitor screen, as shown in the second embodiment (step S14). If a dot-by-dot combining ratio is used in the combining process (step S14: Yes), the system control unit 115 outputs an instruction to the combining-ratio setting circuit 182 in the parameter setting circuit 171, and the combining-ratio setting circuit 182, for example, sets the combining ratios of the dots of the graphic picture dots and the dots of the imaged picture for the combined picture area within the monitor screen, and determines how to alter those ratios according to the elapse of line connection time (step S15).

If a combined picture is not to be sent (step S11: No), however, the system control unit 115 decides whether or not to send a graphic picture, according to the settings of the operation unit 111 (step S16). If a graphic picture is to be sent (step S16: Yes), the system control unit 115 outputs an instruction to the picture-data selection circuit 173 in the picture-data processing unit 170c to select the graphic picture data, and the picture-data selection circuit 173 selects and outputs the data of a graphic picture read from the picture-data memory unit 150 (step S17).

If the graphic picture is not to be sent (step S16: No), the system control unit 115 outputs an instruction to the picture-data selection circuit 173 in the picture-data processing unit 170c to select the imaged picture data, and the picture-data selection circuit 173 selects and outputs the imaged picture data received from the imaging unit 13 (step S18).

If the dot-by-dot combining ratio is not used in the combining process (step S14: No), the system control unit 115 terminates the setting process. The setting process is also terminated when the settings of step S17 or S18 have terminated.

As described above, when the line is connected, or a call is placed on hold, the processes described in the first and second embodiments can both be performed in combination, so privacy can be protected more effectively than in the above embodiments, and the communicating party can more effectively be kept from worrying about line trouble or malfunctions of the videophone apparatus.

Also, in the third embodiment, when a person hangs up, the communicating party's surprise or annoyance can be lessened, the communicating party is not caused unnecessary worry, and the user who disconnects the communication line first can be left with fewer bad feelings, more effectively than in the two embodiments above.

The other effects of the third embodiment are similar to the effects of the first and second embodiments, so descriptions will be omitted.

Figure 19:
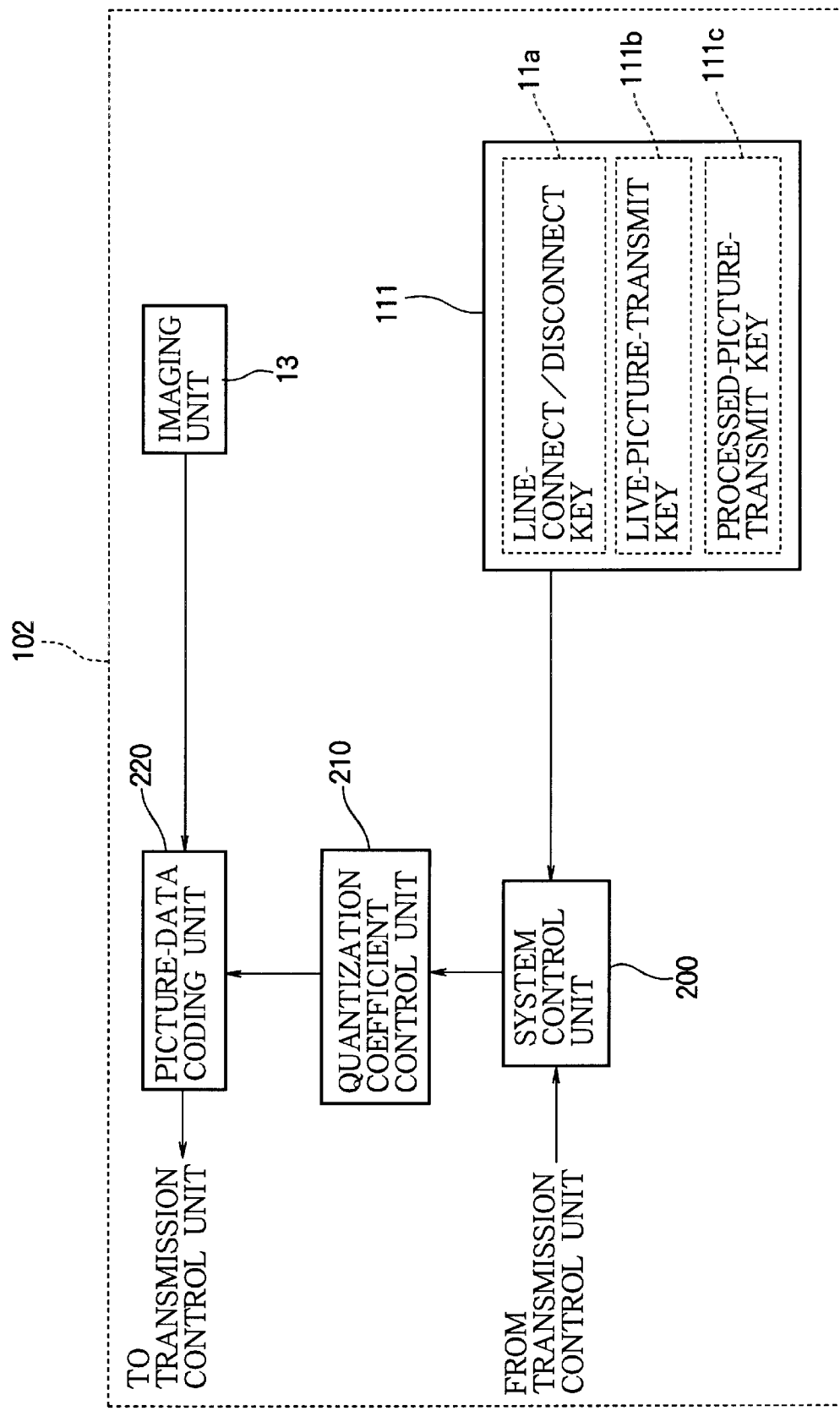
FIG. 19 is a block diagram showing the structure of those blocks of the videophone apparatus of a fourth embodiment that relate to the coding of the transmitted picture.

FIG. 19 is a block diagram showing the structure of those blocks of a fourth videophone apparatus 102 embodying the present invention that relate to the coding of the transmitted picture. Except for the blocks shown in FIG. 19, the structure of the videophone apparatus of this fourth embodiment is similar to that of the three embodiments above. The fourth embodiment will accordingly be described below with reference to FIGS. 2, 4, and 22 as well as to FIG. 19.

The blocks relating to the coding of the transmitted picture in FIG. 19 differ from the blocks relating to the coding of the transmitted picture in the first embodiment shown in FIG. 1 in that the picture-data memory unit 150 and picture-data processing unit 170 of FIG. 1 are removed in FIG. 19, and a quantization coefficient control unit 210 is provided between the system control unit 200 and the picture-data coding unit 220. The imaging unit 13 and the operation unit 111 are as described in the first embodiment, so redundant descriptions will be omitted.

Differing from the three embodiments above, the system control unit 200 of the fourth embodiment outputs a signal to the quantization coefficient control unit 210 to alter the quantization coefficient in the picture-data coding unit 220. Also, the quantization coefficient control unit 210 outputs a quantization coefficient control signal to control quantization, which is one part of the coding in the picture-data coding unit 220.

Figure 20:
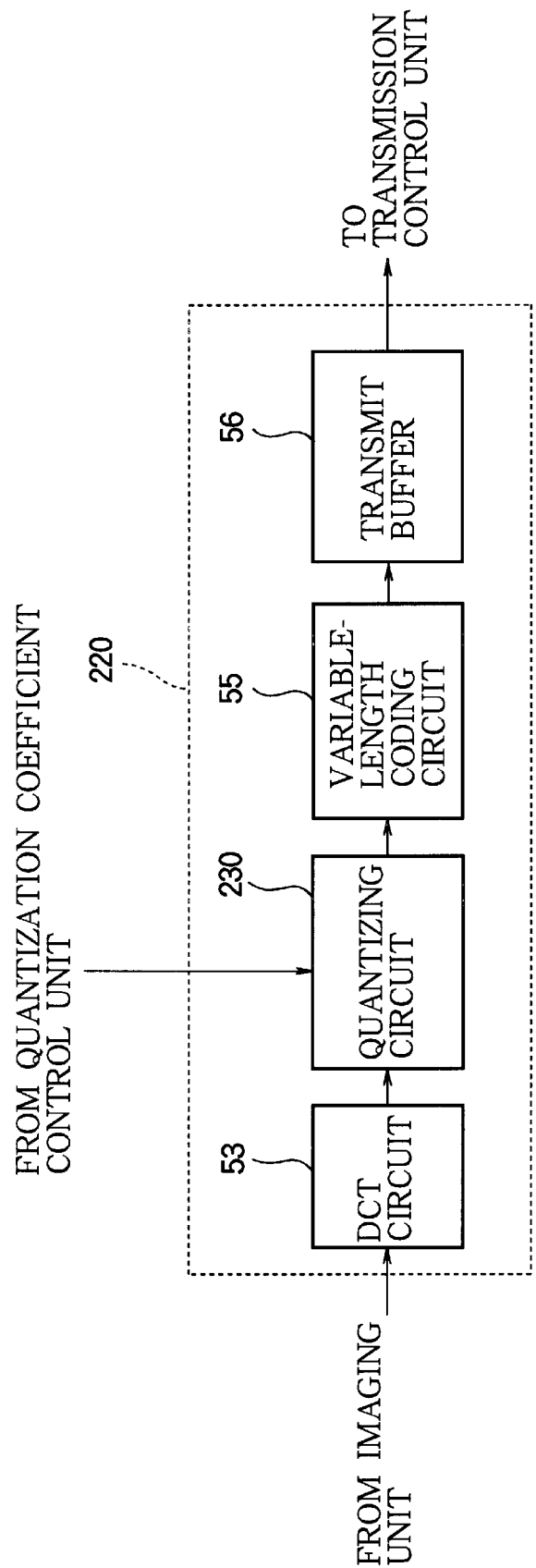
FIG. 20 is a block diagram showing the internal structure of the picture-data coding unit in the videophone apparatus of the fourth embodiment.

FIG. 20 is a block diagram showing the internal structure of the picture-data coding unit 220 in the videophone apparatus 102 of the fourth embodiment.

The picture-data coding unit 220 in FIG. 20 differs from the picture-data coding unit 190 of the first embodiment shown in FIG. 5 in that imaged picture data are input directly from the imaging unit 13 to the DCT circuit 53 of the picture-data coding unit 220, and a signal controlling quantization is input from the quantization coefficient control unit 210 to the quantizing circuit 230 in FIG. 20. Except for the blocks shown in FIGS. 19 and 20 the structure of the videophone apparatus 102 of the fourth embodiment is similar to the above the first embodiment, so redundant descriptions will be omitted.

The reason for providing a quantization coefficient control unit 210 and controlling the quantization coefficient in the quantizing circuit 230 will now be explained.

If the quantization coefficient in the quantizing circuit 230 is altered, mosaic processing can be performed on the picture sent to the other party. Specifically, if the quantization coefficient for quantizing the DCT conversion output of the input picture is set high, a mosaic effect is produced in the output picture, and the live picture is disguised.

The quantization coefficient is related to the size of the blocks (squares, or cells) in the mosaic effect. The larger the quantization coefficient is, the larger the cell size becomes; the mosaic effect is increased. The smaller the quantization coefficient is, the more realistic the decoded picture becomes; the mosaic effect is reduced. That is, the quantization coefficient and the mosaic effect on the output picture are mutually proportional.

Like the image processing performed in the second embodiment, the mosaic effect reduces the clarity of the displayed picture. Effects similar to those of the second embodiment when the line is connected and disconnected can be obtained by setting the quantization coefficient to an initial high value, gradually reducing the value with the elapse of line connection time, and gradually increasing the quantization coefficient when the line is disconnected.

The operation of the fourth embodiment will be described below with reference to FIGS. 19, 20, and FIG. 22.

Figure 21:
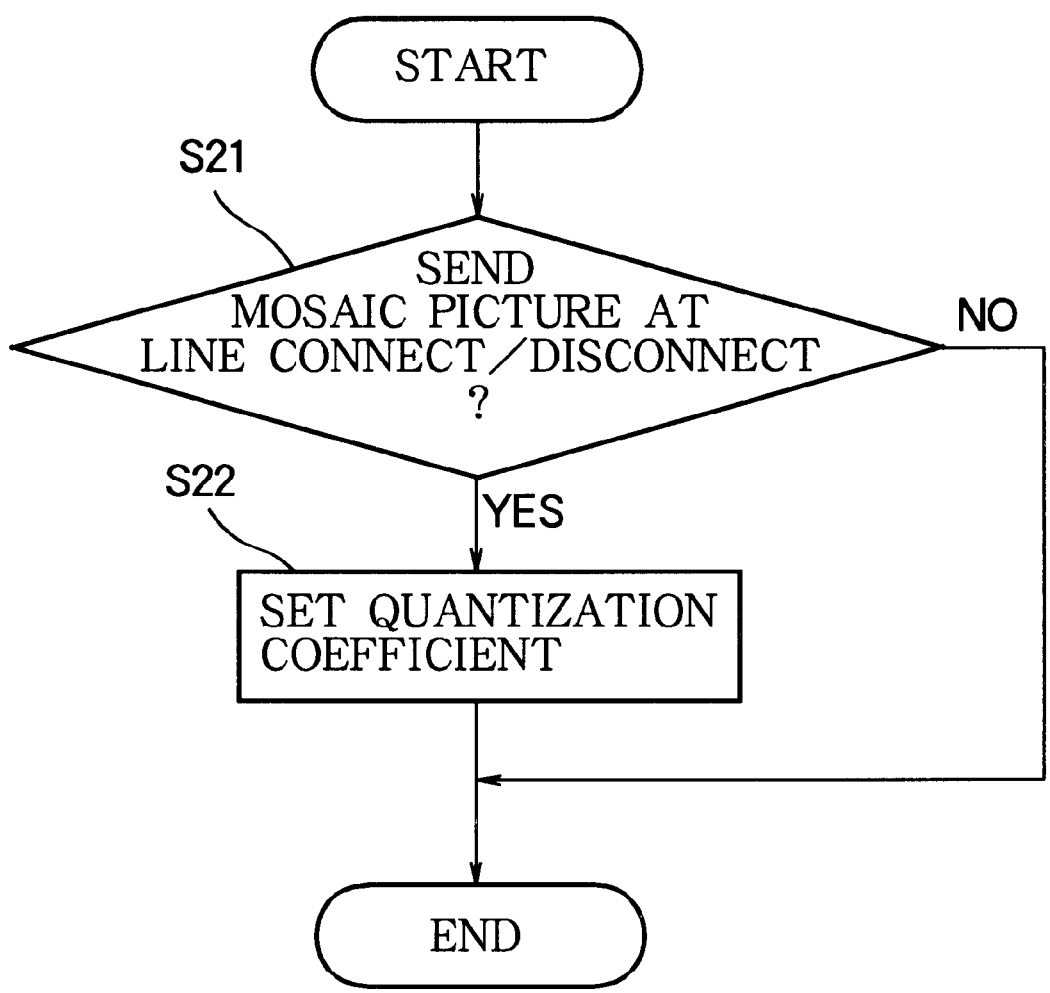
FIG. 21 is a flowchart showing the setting process of the quantization coefficient control unit in the fourth embodiment when the line is connected or the line is disconnected.

FIG. 21 is a flowchart showing the setting process of the quantization coefficient control unit 210 in the fourth embodiment when the line is connected or the line is disconnected.

When the system control unit 115 receives a notification of line connection or disconnection from the transmission control unit 18 of the videophone apparatus 102, the system control unit 115 decides whether or not to send a mosaic picture to the other party, according to information set by the live-picture-transmit key 111*b* or processed-picture-transmit key 111*c* in the operation unit 111 (step S21).

If a mosaic picture is to be sent (step S21: Yes), the system control unit 115 outputs an instruction to the quantization coefficient control unit 210, according to the settings of the operation unit 111, and the quantization coefficient control unit 210, for example, sets quantization coefficients altering the degree of the mosaic processing when it is performed on the imaged picture, and determines how to alter those quantization coefficients with the elapse of line connection time (step S22).

If a mosaic picture is not to be sent (step S21: No), the setting process is terminated.

As described above, the fourth embodiment has effects similar to the effects of the second embodiment: when the communication line is connected, the mosaic cell size gradually becomes finer and the display clearer, as the quantization coefficient of the quantizing circuit 230 is made to decrease gradually responsive to the line connection time; the sending to the other party's side of conditions on the near side that should not be made known to the other party, as an imaged picture, by the picking up of the handset when the telephone apparatus rings, for example, is eliminated; one can protect one's privacy because conditions that one would like to keep hidden from the other party are not sent straight through to the other party; and the communicating party can be kept from worrying about line trouble or a malfunction of the videophone apparatus.

Also, when a call is placed on hold while a party is communicating with another party while sending a live picture, by operating the processed-picture-transmit key 111*c* of the operation unit 111, as in the second embodiment, for example, the party can blur the scene of a frantic search for another person or reference materials, and can avoid showing it plainly. When the person or materials have been found and communication is resumed, by operating the live-picture-transmit key 111*b* of the operation unit 111, the party can again communicate with the other party while sending a clear live picture. That is, the user on the picture-sending side can send a clear picture when he or she actively wants to show his or her own picture to the other party.

Also, when a person hangs up, the other party's surprise or annoyance at seeing the person's face disappear from the monitor screen is reduced, because the face disappears gradually. This occurs because the quantization coefficient increases responsive to elapsed time from the operation of the line-connect/disconnect key, causing the mosaic cell size to increase and the picture to become gradually unclear. The other party is also reassured that the disconnection is normal, and is not due to a malfunction of the telephone set or communication network. Although the slow disappearance of the picture may allow the other party to see the person who hangs up start to leave the videophone apparatus, or perform some other action that the person did not intend to transmit to the other party, the action is not transmitted clearly, because the mosaic cell size is increasing, and in any case the picture transmission soon ends.

For the same reason, the person who hangs up first need not feel that he or she has committed a breach of etiquette.

The mosaic cell size may be varied by a linear increase or decrease in the quantization coefficient, or by any other method; for example, the quantization coefficient may be varied according to the curve of a quadratic function or the like.

As the fourth embodiment requires only an additional quantization coefficient control unit 210, a privacy protection function can be implemented by adding only a small amount of circuitry to a videophone apparatus. The quantization coefficient control unit 210 can also be adapted to let the user vary the quantization coefficient, hence the mosaic cell size, at his or her discretion, again providing privacy protection with only a small amount of additional circuitry.

The fourth embodiment can be combined with any of the three embodiments above. In that case, the user can select a screen better matching his or her preferences at the time of line connection/disconnection or hold.

In the first three embodiments, the keys added to the operation unit 111 need not be limited to a live-picture-transmit key 111*b* and a processed-picture-transmit key 111*c*: for example, a key for deterring malicious calls may be provided; when this key is pressed, a message screen lodging an objection to the call, stored in the picture-data memory unit 150, is sent to the other party.

The communication network 40 in the embodiments above is not limited to a wired network; needless to say, it may include wireless links.

In the setting process in the parameter setting circuit 171 in the third embodiment, first the position and area were set, then pixel-by-pixel combining was performed in the combining area, but this setting process may be adapted so that first pixel-by-pixel combining is performed on the entire picture area, then a position and area are set, and the combined picture and the imaged picture, or the combined picture and the graphic picture, are combined by position and area.

According to one aspect of the invention, processing contents selection keys, a picture-data memory unit, and a picture-data processing unit are provided, and when one does not want one's condition to be transmitted to the other party, a picture prepared in advance is sent to the other party in place of the picture input from the imaging unit by a key operation, so the privacy of the picture-sending party can be protected without causing the communicating party to worry about line abnormalities or the like. Also, after preparations are complete on the picture-sending side, one can switch by a key operation from the prepared picture to the picture input from the imaging unit.

According to another aspect of the invention, a certain area is provided in the full screen area, and combined picture data with the picture input from the imaging unit confined to that certain area can be sent to the communicating party, so the displeasure experienced by the other party because no face is displayed on the monitor screen can be mitigated by sending the conditions on one's own side, even if only partially, to the communicating party.

According to yet another aspect of the invention, combined picture data rendered intentionally unclear by performance of overlay processing on the picture input from the imaging unit can be sent to the communicating party by combining the pixel dots of a picture prepared in advance and the pixel dots of the picture input from the imaging unit, dot by dot, so the displeasure experienced by the other party because no face is displayed on the monitor screen can be mitigated by sending the conditions on one's own side, even if only unclearly, to the communicating party.

According to still another aspect of the invention, the combining ratios of the combined picture data sent to the communicating party can be gradually increased or gradually decreased according to elapsed time after an instruction from the user or a notification from the line, and the picture input from the imaging unit can be sent to the other party so that its area gradually increases or it gradually becomes clearer, so the shock or displeasure given to the communicating party by the sudden appearance or disappearance of the other party's face on the monitor screen can be lessened, and the degree to which the user on the picture-sending side feels compunctions or feels badly afterward can be reduced.

According to a further aspect of the invention, when the combining ratios of the combining-processed picture data are gradually increased or gradually decreased, if a combining ratio reaches 100% or 0% the combining process is terminated, and the picture input from the imaging unit or the picture prepared in advance is sent, or the line is disconnected, so a transition to the normal videophone apparatus communication state can be made, or communication can be terminated, without causing the communicating party to feel stress.

According to a still further aspect of the invention, a picture of the user of the videophone apparatus is used as the picture prepared in advance, so a transition to the normal videophone apparatus communication state can be made, or communication can be terminated, without causing the communicating party to experience a strong sense of incongruity.

According to another aspect of the invention, a picture in which a picture combining process has been performed on a picture of the user of the videophone apparatus is used as the picture prepared in advance, so a picture that is more pleasing to the user on the picture-sending side can be sent to the other party.

According to yet another aspect of the invention, the combining process is started on the basis of one of a line connection instruction, a line disconnection instruction, a line hold instruction, and a line-hold release instruction input from the operation unit, so the user on the picture-sending side can start the combining process at an arbitrary time, and ease of use can be improved.

According to still another aspect of the invention, the combining process is started when a line disconnection due to a line-disconnection instruction from the operation unit is detected, so the start timing of the combining process becomes precise, and the transition to the videophone apparatus communication state can be made with even less shock, displeasure, stress, and sense of incongruity given to the communicating party than in the preceding embodiments.

According to another aspect of the invention, processing contents selection keys, a picture-data memory unit, and a picture-data processing unit are provided, and when one does not want one's condition to be transmitted to the other party, a picture in which the quantization coefficient of the picture input from the imaging unit is controlled (a mosaic-processed picture) is sent to the other party by a key operation, so the privacy of the picture-sending party can be protected without making the communicating party worry about line abnormalities or the like. Also, after preparations are complete on the picture-sending side, one can switch by a key operation to a picture on which mosaic processing has not been performed.

According to yet another aspect of the invention, the quantization coefficient used in quantization of the picture data sent to the communicating party is gradually increased or gradually decreased according to elapsed time after an instruction from the user or a notification from the line, and the picture input from the imaging unit can be sent to the other party so that it gradually becomes clearer or gradually becomes less clear, so the surprise or displeasure given to the communicating party by the sudden appearance or disappearance of the other party's face on the monitor. screen can be lessened, and the degree to which the user on the picture-sending side feels compunctions or feels badly afterward can be reduced.

According to still another aspect of the invention, control of the quantization coefficient is started on the basis of one of a line connection instruction, a line disconnection instruction, a line hold instruction, and a line-hold release instruction input from the operation unit, so the user on the picture-sending side can start the combining process at an arbitrary time, and ease of use can be improved.

According to another aspect of the invention, control of the quantization coefficient is started when a line connection due to a line connection instruction from the operation unit is detected, so the start timing of the combining process becomes precise, and the transition to the videophone apparatus communication state can be made with even less surprise, displeasure, stress, and sense of incongruity given to the communicating party than in the preceding embodiments.

According to one more aspect of the invention, control of the quantization coefficient is performed before picture data on which a combining process has been performed are sent, so the privacy of the picture-sending side can be protected more certainly.

Several variations of the embodiments have been described above, but those skilled in the art will recognize that further variations are possible within the scope claimed below.

What is claimed is:

1. A method of sending pictures from a first videophone apparatus to a second videophone apparatus during a call placed between the first videophone apparatus and the second videophone apparatus, comprising the steps of:
   (a) taking a live picture of the user of the first videophone apparatus;
   (b) sending a live picture to the second videophone apparatus during one part of said call;
   (c) generating a processed picture different from said live picture by combining said prepared picture with said live picture according to a determined ratio;
   (d) sending the processed picture to the second videophone apparatus during another part of said call; and
   (e) varying said ratio with the elapse of time;
      wherein a dynamic selection between sending said live picture or said generated picture may be made prior to or during said call by a user of the first videophone apparatus.

2. The method of claim 1, further comprising the steps of:
   (f) preparing said processed picture in advance of said call; and
   (g) storing said processed picture in a memory unit in the first videophone apparatus.

3. The method of claim 1, wherein said step (c) further comprises the steps of:
   (h) obtaining said prepared picture in advance of said call; and
   (i) storing said prepared picture in a memory unit in the first videophone apparatus
      prior to combining said prepared picture with said live picture.

4. The method of claim 1 wherein said step (c) includes combining a first part of said prepared picture with a second part of said live picture, the first part being displayed separately from the second part in said processed picture, said ratio being a size ratio of the first part and the second part.

5. The method of claim 1, wherein said step (c) includes overlaying said live picture semi-transparently on said prepared picture by combining said prepared picture data and said live picture data dot by dot, said ratio being a transparency ratio.

6. The method of claim 1, wherein said step (e) is carried out during at least one of a beginning of said call, an end of said call, a beginning of a period in which said call is placed on hold, and an end of a period in which said call is placed on hold.

7. The method of claim 1, wherein said step (c) includes altering said live picture by increasing a quantization coefficient of said live picture, thereby producing a mosaic effect disguising said live picture.

8. The method of claim 7, wherein said step (e) includes:
 (j) varying said quantization coefficient, thereby varying a cell size of said mosaic effect.

9. The method of claim 8, wherein said step (j) is carried out during at least one of a beginning of said call, an end of said call, a beginning of a period in which said call is placed on hold, and an end of a period in which said call is placed on hold.

10. A videophone apparatus used as a terminal in a videophone system that transmits both voice data and picture data through a communication line, having an imaging unit that takes a live picture of a user and outputs live picture data, a picture-data coding/decoding unit that codes said live picture data for transmission on the communication line and decodes picture data received from the communication line, a display unit that displays the decoded picture data, and an operation unit by which the user enters instructions, comprising:

a picture-data memory unit storing prepared picture data representing a prepared picture different from said live picture;

a picture-data processing unit connected to said imaging unit and said picture-data memory unit, combining said live picture data with said prepare picture data to generate combined picture data in accordance with a determined ratio, and varies said ratio with the elapse of time; and a system control unit connected to said picture-data processing unit, causing said picture-data processing unit to supply said combined picture-data processing unit to supply said combined picture data to said picture-data coding/decoding unit and causing said picture-data coding/decoding unit to code said combined picture data in place of said live picture data for transmission on said communication line, responsive to an instruction entered prior to or during the operation of said videophone by said user on said operation unit.

11. The videophone apparatus of claim 10, wherein said picture-data processing unit replaces said live picture data with said prepared picture data, causing said prepared picture to become said combined picture data.

12. The videophone apparatus of claim 10, wherein said picture-data processing unit selects an area in said prepared picture and replaces said prepared picture data with said live picture data in the selected area.

13. The videophone apparatus of claim 10, wherein said live picture and said prepared picture comprise dots, and said picture-data processing unit semi-transparently overlays said live picture on said prepared picture by combining said prepared picture data and said live picture data dot by dot.

14. The videophone apparatus of claim 10, wherein said picture-data processing unit varies said ratio over elapsed time from one of an instruction entered by said user on said operation unit and a notification received from said communication line.

15. The videophone apparatus of claim 10, wherein said system control unit causes said picture-data processing unit to begin combining said live picture data with said prepared picture data responsive to one of a line connection instruction entered by said user, a line disconnection instruction entered by said user, a line hold instruction entered by said user, a line-hold release instruction entered by said user, and a line connection notification received from said communication line after said user enters a line connection instruction.

16. A videophone apparatus used as a terminal in a videophone system that transmits both voice data and picture data through a communication line, comprising:

an imaging unit that takes a live picture of a user and outputs live picture data;

a picture-data coding/decoding unit that codes said live picture data for transmission on the communication line by a process including quantization, and decodes picture data received from the communication line and further combines said live picture data with a prepared picture data using a determined ratio to generate a combined picture data, and varies said ratio with the elapse of time;

a display unit that displays the decoded picture data;

an operation unit by which the user enters instructions;

a quantization coefficient control unit controlling a quantization coefficient used by said picture-data coding/decoding unit in said process including quantization and the production of a mosaic effect in said live picture; and a system control unit connected to said quantization coefficient control unit, causing said quantization coefficient control unit to alter said quantization coefficient responsive to an instruction entered by said user on said operation unit.

17. The videophone apparatus of claim 16, wherein said mosaic effect in said live picture is produced in said quantization coefficient control unit by controlling said quantization coefficient, and gradually altering said quantization coefficient over time, thereby gradually altering a cell size of said mosaic effect.

18. The videophone apparatus of claim 16, wherein said system control unit causes said quantization coefficient control unit to begin altering said quantization coefficient responsive to one of a line connection instruction entered by said user, a line disconnection instruction entered by said user, a line hold instruction entered by said user, a line-hold release instruction entered by said user, and a line connection notification received from said communication line after said user enters a line connection instruction.

19. The videophone apparatus of claim 16, further comprising:

a picture-data memory unit that stores said prepared picture data representing a prepared picture which is different from said live picture.

* * * * *